(12) United States Patent
Suwa et al.

(10) Patent No.: US 6,535,619 B1
(45) Date of Patent: Mar. 18, 2003

(54) ADDRESS RECOGNITION APPARATUS AND METHOD

(75) Inventors: Misako Suwa; Satoshi Naoi, both of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/229,329

(22) Filed: Jan. 13, 1999

(30) Foreign Application Priority Data

Jan. 22, 1998 (JP) .......................................... 10-010643
Oct. 1, 1998 (JP) .......................................... 10-279931

(51) Int. Cl.[7] ................................................. G06K 9/00
(52) U.S. Cl. ........................ 382/101; 382/179; 382/187
(58) Field of Search ................................ 382/187, 186, 382/188, 189, 190, 191, 171, 174, 176, 178, 179, 180, 181, 182, 183, 184, 185, 101, 102

(56) References Cited

U.S. PATENT DOCUMENTS

| | | | | |
|---|---|---|---|---|
| 4,731,857 A | * | 3/1988 | Tappert ........................... | 382/9 |
| 4,811,412 A | * | 3/1989 | Katsurada ....................... | 382/9 |
| 5,050,218 A | * | 9/1991 | Ikeda et al. ..................... | 281/1 |
| 5,293,429 A | * | 3/1994 | Pizano et al. ................... | 382/24 |
| 5,581,633 A | * | 12/1996 | Hotta et al. ................... | 382/171 |
| 5,825,920 A | * | 10/1998 | Kitamura et al. ............. | 382/178 |

FOREIGN PATENT DOCUMENTS

| | | |
|---|---|---|
| JP | 3-62287 | 3/1991 |
| JP | 5-81477 | 4/1993 |
| JP | 7-225818 | 8/1995 |
| JP | 7-262320 | 10/1995 |
| JP | 9-161013 | 6/1997 |
| KR | 95-0001059 | 2/1995 |
| KR | 96-701413 | 2/1996 |
| KR | 97-002740 | 1/1997 |
| KR | 97-0004539 | 3/1997 |

OTHER PUBLICATIONS

Babaguchi et al., "Proposal Segmentation Method of Handwritten Document Image into Individual Characters with Use of Document Specific Knowledge", Technical Research Reports of the Institute of Electronics & Communication Engineers of Japan, PRL85–63 published on Jan. 17, 1986, pp. 43–50.

Babaguchi et al., "A Proposal for Incorporating Recognition Process to Improve Performance of Handwritten Character Segmentation Associated with Character Recognition Process", the Transactions of the Institute of Electronics and Communication Engineers of Japan, vol. J69D, No. 11, Nov. 1986, pp. 1774–1782.

Shiku et al., "Experiments of Handwritten Character String Classification by Pattern Matching Method", the Transactions of the Institute of Electronics and Communication Engineers, vol. J80–D–11 No. 5, May 1997, pp. 1326–1328.

* cited by examiner

Primary Examiner—Andrew W. Johns
Assistant Examiner—Seyed Azarian
(74) Attorney, Agent, or Firm—Staas & Halsey LLP

(57) ABSTRACT

When a pattern of an address to be recognized is input, contact characters are separated after determining the contact position of the contact characters. A key character is extracted by recognizing characters for each of the separated characters. After extracting the key character, patterns delimited by the key character are collectively retrieved. A place-name word is recognized by comparing a feature vector of the entire pattern delimited by the key character with a feature vector of the place-name word.

54 Claims, 29 Drawing Sheets

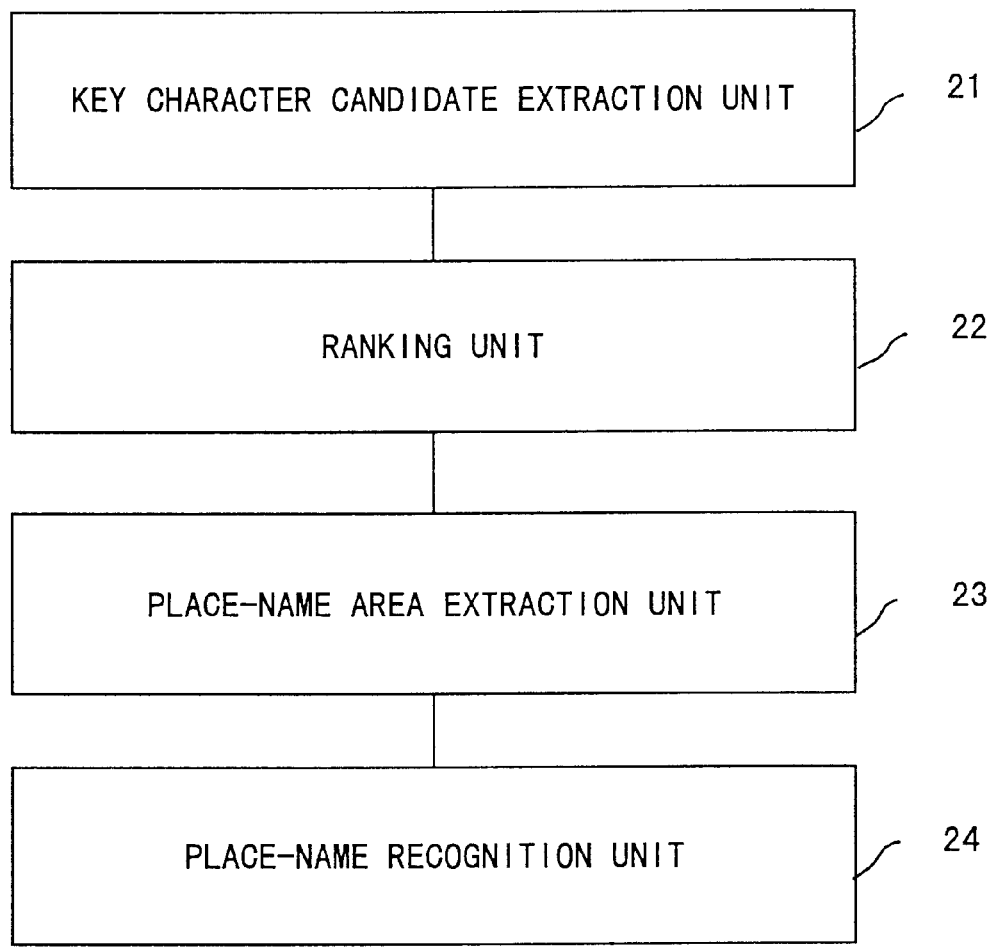
F I G. 6

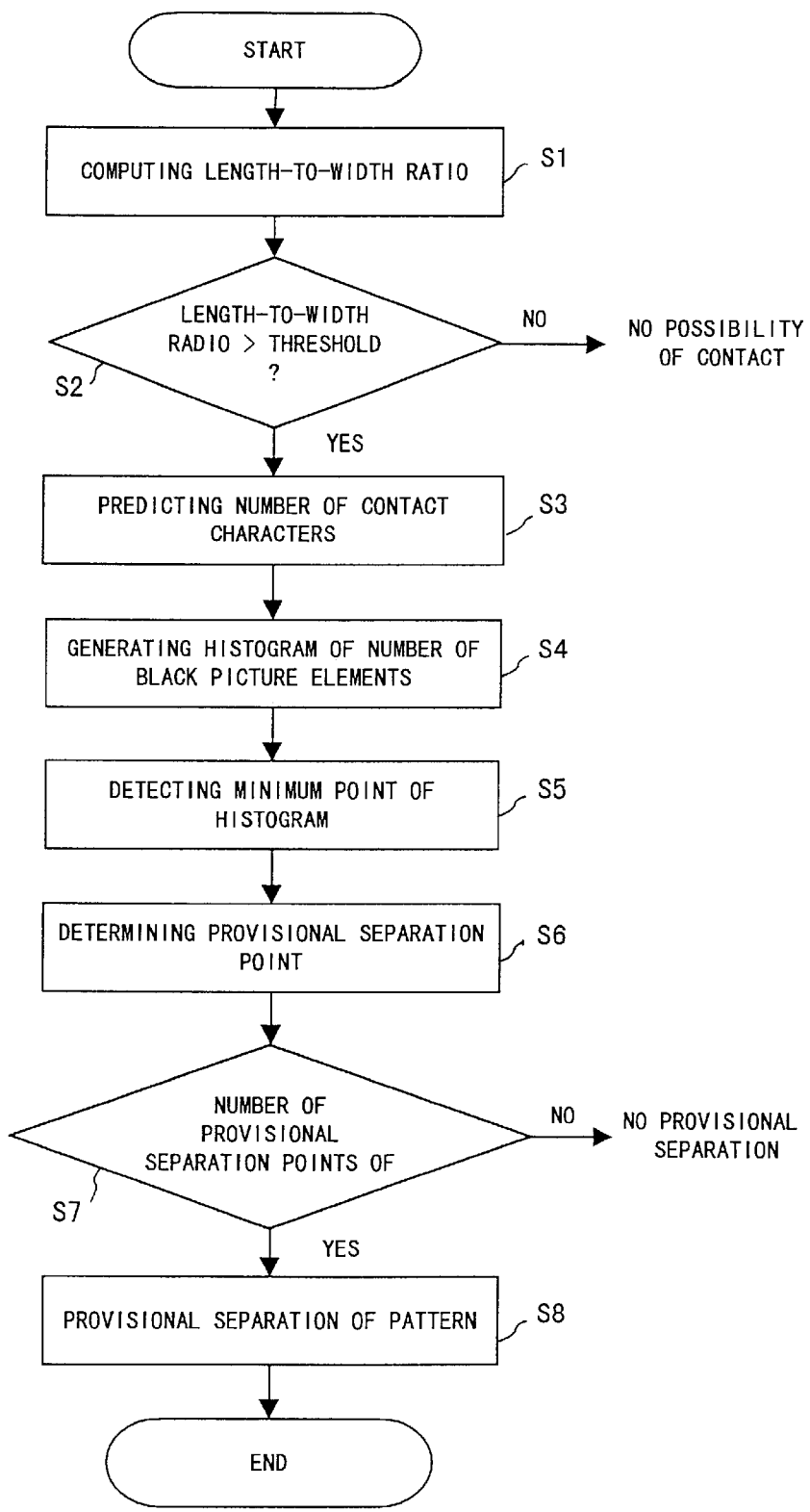
F I G. 8

× : INTEGRATION IMPOSSIBLE    ○ : INTEGRATION POSSIBLE

FIG. 14A

SINGLE PATTERN (K12)

| ORDER | CANDIDATE | DISTANCE |
|---|---|---|
| 1 | 付 | 506 |
| 2 | 竹 | 518 |
| 3 | 甘 | 536 |
| 4 | 対 | 538 |
| 5 | 行 | 551 |
| 6 | 所 | 554 |
| 7 | 氏 | 559 |
| 8 | 科 | 561 |
| 9 | 杵 | 572 |
| 10 | 同 | 574 |

FIG. 14B

PROVISIONAL INTEGRATION PATTERN (K15)

| ORDER | CANDIDATE | DISTANCE |
|---|---|---|
| 1 | 市 | 253 |
| 2 | 布 | 351 |
| 3 | 府 | 398 |
| 4 | 弟 | 406 |
| 5 | 巾 | 413 |
| 6 | 右 | 432 |
| 7 | 虎 | 435 |
| 8 | 防 | 436 |
| 9 | 古 | 446 |
| 10 | 街 | 451 |

| | FLAG | HIERARCHICAL LEVEL | CHARACTER TYPE | KEY CHARACTER LEVEL | LINE NUMBER | ORDER IN LINE | ･･ |
|---|---|---|---|---|---|---|---|
| RECTANGLE K11 SINGLE | 2 | 4 | 村 | 2 5 . 4 % | 1 | 1 | |
| PLURAL | — | — | | | | | |
| RECTANGLE K12 SINGLE | 0 | | | 0 . 0 % | 1 | 2 | |
| PLURAL | 1 | 2 | 市 | 6 5 . 5 % | 1 | 2 | |
| RECTANGLE K13 SINGLE | 0 | | | 0 . 0 % | 1 | 3 | |
| PLURAL | 0 | | | 0 . 0 % | 1 | 3 | |
| RECTANGLE K14 SINGLE | 0 | | | 0 . 0 % | 1 | 4 | |
| PLURAL | 1 | 2 | 郡 | 6 3 . 4 % | 1 | 4 | |
| RECTANGLE K4 SINGLE | 2 | 3 | 区 | 4 5 . 8 % | 1 | 5 | |
| PLURAL | — | — | | | | | |
| RECTANGLE K5 SINGLE | 0 | | | 0 . 0 % | 1 | 6 | |
| PLURAL | — | — | | | | | |
| RECTANGLE K8 SINGLE | 1 | 2 | 市 | 6 0 . 0 % | 1 | 7 | |
| PLURAL | — | — | | | | | |
| RECTANGLE K10 SINGLE | 1 | 4 | 町 | 6 7 . 9 % | 1 | 8 | |
| PLURAL | — | — | | | | | |

FLAG : 1 KEY CHARACTER CANDIDATE　　2 SEMI-KEY CHARACTER CANDIDATE　　0 OTHER CHARACTER TYPE

FIG. 15

| LEVEL 1 | LEVEL 2 | LEVEL 3 | LEVEL 4 |
|---|---|---|---|
| 都, 道, 府, 県 | 市, 郡 | 区 | 町, 村 |

FIRST SET      {市, 町}       ○市○○○町
SECOND SET     {郡, 町}       ○○郡○○町
THIRD SET      {市}           ○○○○市○

FIG. 18B

| | FLAG | HIERARCHICAL LEVEL | CHARACTER TYPE | KEY CHARACTER LEVEL | LINE NUMBER | ORDER IN LINE | .. |
|---|---|---|---|---|---|---|---|
| RECTANGLE K21 SINGLE | 0 | | | 0.0% | 1 | 1 | |
| PLURAL | 0 | | | 0.0% | 1 | 1 | |
| RECTANGLE K22 SINGLE | 0 | | | 0.0% | 1 | 2 | |
| PLURAL | 0 | | | 0.0% | 1 | 2 | |
| RECTANGLE K23 SINGLE | 0 | | | 0.0% | 1 | 3 | |
| PLURAL | 0 | | | 0.0% | 1 | 3 | |
| RECTANGLE K24 SINGLE | 0 | | | 0.0% | 1 | 4 | |
| PLURAL | — | — | | — | — | — | |
| RECTANGLE K25 SINGLE | 0 | | | 0.0% | 1 | 5 | |
| PLURAL | 1 | 2 | 郡 | 67.6% | 1 | 5 | |
| RECTANGLE K26 SINGLE | 2 | 2 | 市 | 21.8% | 1 | 6 | |
| PLURAL | — | — | | — | — | — | |
| RECTANGLE K27 SINGLE | 2 | 3 | 区 | 29.6% | 1 | 7 | |
| PLURAL | — | — | | — | — | — | |
| RECTANGLE K28 SINGLE | 0 | | | 0.0% | 1 | 8 | |
| PLURAL | — | — | | — | — | — | |
| RECTANGLE K29 SINGLE | 2 | 4 | 町 | 47.9% | 1 | 9 | |
| PLURAL | — | — | | — | — | — | |
| RECTANGLE K30 SINGLE | 0 | | | 0.0% | 1 | 10 | |
| PLURAL | 0 | | | 0.0% | | 10 | |
| RECTANGLE K31 SINGLE | 0 | | | 0.0% | 1 | 11 | |
| PLURAL | 0 | | | 0.0% | | 11 | |
| RECTANGLE K32 SINGLE | 0 | | | 0.0% | 1 | 12 | |
| PLURAL | 0 | | | 0.0% | | 12 | |
| RECTANGLE K33 SINGLE | 0 | | | 0.0% | 1 | 13 | |
| PLURAL | 0 | | | 0.0% | 1 | 13 | |

FIG. 20

FIG. 21A
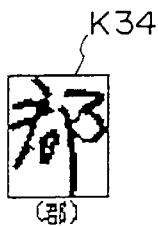
KEY CHARACTER EXTRACTION RESULT
FIG. 21B
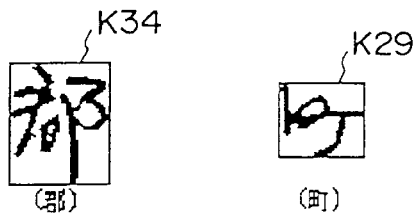
KEY CHARACTER RE-EXTRACTION RESULT
FIG. 21C
FIRST SET  {郡,町}
KEY CHARACTER SET CANDIDATE

| SAMPLE | CORRECT CHARACTER TYPE | RECOGNITION RESULT USING ALL CHARACTER TYPE CHARACTER TYPE / DISTANCE | RECOGNITION RESULT USING ONLY KEY CHARACTER TYPES CHARACTER TYPE / DISTANCE |
|---|---|---|---|
| 61 → (見) | 見 | (見, 貝, 県, …) (210, 250, 320, …) | (県, 道, …) (320, 640, …) |
| 62 → (県) | 県 | (県, 見, 貝, …) (320, 480, 590, …) | (県, 道, …) (320, 480, …) |

FIG. 22

| KEY CHARACTER TYPE | 都 | 道 | 府 | 県 | 市 | 郡 | 区 | 町 | 村 |
|---|---|---|---|---|---|---|---|---|---|
| SIMILAR CHARACTER TYPE | 者 | 追 | 麻 | 呉 | 布 | 都 | 匹 | 野 | 付 |
| | 部 | 造 | 狩 | 具 | 巾 | 邦 | 巨 | 財 | 対 |
| | 祁 | 迫 | 有 | 貝 | 希 | 部 | 匠 | 時 | 杖 |
| | 郎 | 通 | 崎 | 見 | 帯 | 郎 | 医 | 肝 | 打 |

FIG. 24

| SAMPLE | CORRECT CHARACTER TYPE | RECOGNITION RESULT USING KEY CHARACTER TYPES CHARACTER TYPES SIMILAR TO KEY CHARACTER TYPES | |
|---|---|---|---|
| | | CHARACTER TYPE | / DISTANCE |
| 61 →  | 見 | (見, 貝, 県, …) | (210, 250, 320, …) |
| 62 →  | 県 | (県, 見, 貝, …) | (320, 480, 590, …) |
FIG. 25

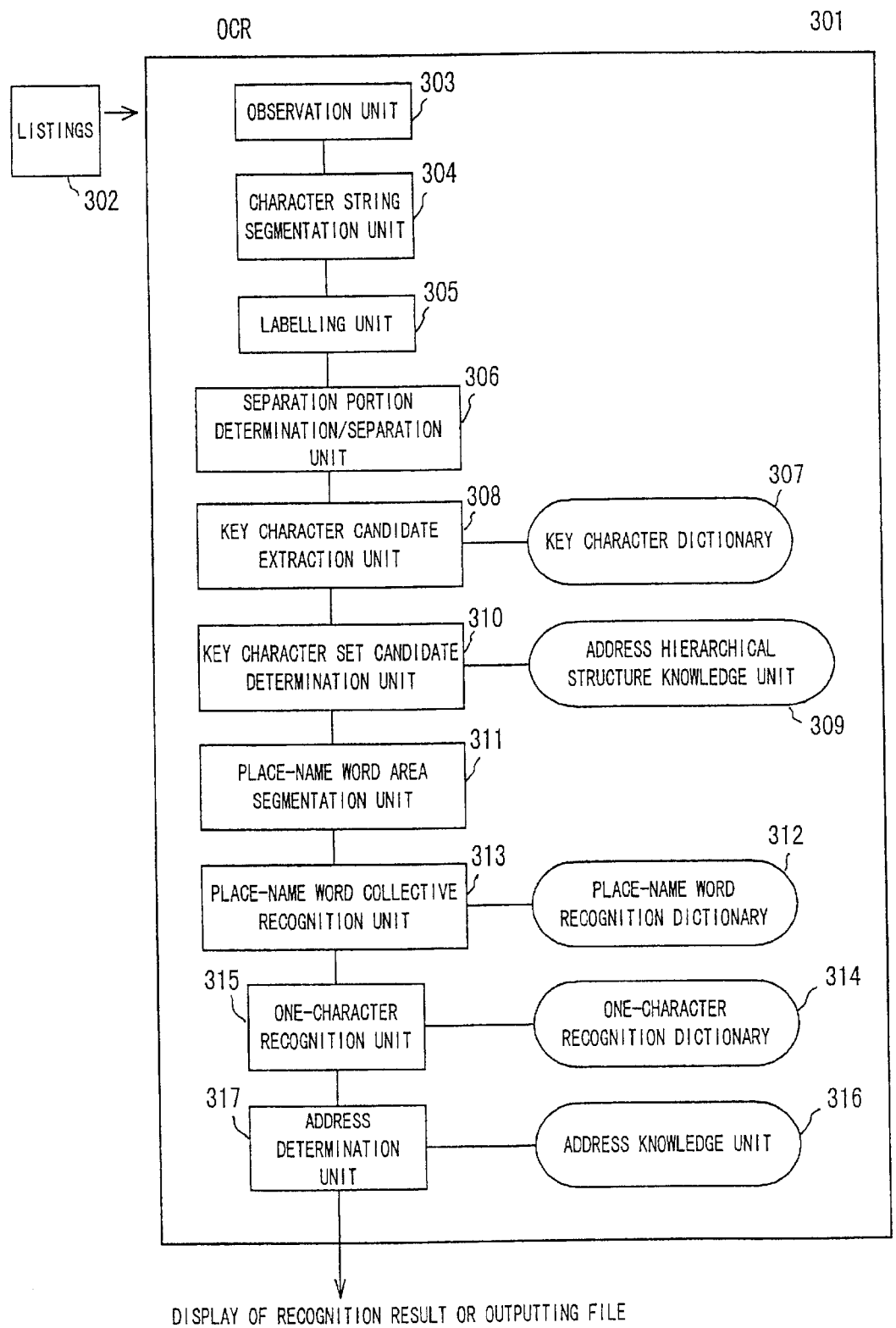
F I G. 2 6

ADDRESS RECOGNITION APPARATUS AND METHOD

BACKGROUND OF THE INVENTION

1. Field of the Invention

The present invention relates to an address recognition apparatus, and more specifically to an apparatus for reading an address from the handwritten characters in a free-pitch area.

2. Description of the Related Art

The conventional optical character recognition apparatus (OCR) specifies a place-name area, and reads an address by extracting a segmentation character (hereinafter referred to as a key character) which can be a delimiter of a place name as a result of recognizing characters one by one.

FIG. 1 is a block diagram showing the configuration of the conventional address recognition apparatus.

In FIG. 1, a character segmentation unit 501 segments a character for all possible segmentation candidates. A character recognition unit 502 outputs the recognition results of the first candidate through the Nth candidates in all possible candidates which can be segmented as a character. If any of the key characters '都' (capital city), '道' (prefecture), '府' (prefecture), '県' (prefecture), '市' (city), '郡' (county), '区' (ward), '町' (town), '村' (village), '字' (area), etc. is included in the first through the Nth candidates, then a key character extraction unit 503 extracts the corresponding candidate as a key character.

A place-name area candidate retrieval unit 504 retrieves an area between key characters as a place-name area candidate. A place-name retrieval unit 506 compares character by character the first candidate through the Mth (M≦N) candidates with a place-name dictionary 505, and retrieves a place-name in the place-name dictionary 505 as a place-name candidate if any one character of the place-name matches the first through Mth candidates. The place-name candidate evaluation value operation unit 507 computes the evaluation value of the a place-name candidate to obtain the most probable place-name candidate from among the place-name candidates retrieved by the place-name retrieval unit 506. The place-name candidate selection unit 509 checks whether or not the place-name candidate retrieved by the place-name retrieval unit 506 is consistent with the place-name candidates before and after the present candidate. If it is consistent, the present place-name candidate is output as an address.

The conventional address recognition apparatus is described in, for example, the Tokukaihei 7-262320.

However, the conventional address recognition apparatus has the problem that it often makes a read error when it reads an address from a handwritten character string in a free-pitch area, and when characters to be read contact with each other. The. contact characters are read as one character.

There is also the problem with the conventional apparatus that the number of patterns to be recognized increases because all possible candidates segmented from a free-pitch area are recognized, thereby requiring a large amount of processes.

Furthermore, when any key character is contained in the first candidate through the Nth candidates, all the candidates are extracted as key characters. Thus, a non-key character is extracted as a key character, and a number of combinations of key characters for segmenting place-name areas appear, thereby requiring a large amount of processes.

If there are place-names, in the first through the Mth candidates, containing a character matching the character contained in the place-name entered in the place-name dictionary 505, the place-names are all retrieved as place-name candidates. Therefore, a large number of place-name candidates are to be recognized, thereby requiring a large amount of processes to specify the address.

SUMMARY OF THE INVENTION

The first object of the present invention is to provide an address recognition apparatus capable of recognizing an address with high precision even if characters contact with each other.

The second object of the present invention is to provide an address recognition apparatus capable of recognizing an address with high precision.

To solve the above listed problems, the present invention includes a key character extraction unit for extracting a key character based on the result of separating contact characters; a place-name area extraction unit for extracting a place-name area based on the position of the key character; and a place-name recognition unit for recognizing the place-name of the place-name area based on the state of the contact characters before separated.

Even if characters forming a character string indicating an address contact with each other, the key character in the character string can be correctly extracted, the entire character string indicating a place-name can be extracted and processed in recognizing the place-name. Therefore, the process of segmenting a character string indicating a place-name into characters can be omitted, and the address can be efficiently recognized. Since it is not necessary to segment a character string indicating a place-name, mis-segmentation of the character string indicating the place-name can be avoided, thereby improving the correctness in address recognition.

According to an aspect of the present invention, the feature vector of the entire pattern segmented by a key character is compared with the feature vector of the place-name entered in the place-name entry dictionary so that the place-name can be recognized.

Thus, the character string indicating the place-name can be recognized without segmentation into single characters, thereby improving the efficiency and correctness in address recognition.

According to another aspect of the present invention, a place-name is entered for each attribute specified by a key character, and the feature vector of a pattern segmented by a key character is compared with a place-name having the attribute specified by a key character.

Thus, for example, if the attribute of the pattern segmented by a key character is '県' (prefecture), a comparing operation is performed using a dictionary containing place-names of '県' (prefecture), thereby performing the comparing operation corresponding to the attribute specified by a key character with improved recognition precision.

According to a further aspect of the present invention, when a connected pattern extracted from an input pattern is separated, the separated position is evaluated based on the size of an input pattern.

Thus, when a key character is extracted from an input pattern, the connected pattern can be separated for the size appropriate for extracting the key character. Therefore, the number of separation positions of the connected pattern can be reduced, and the number of times of the recognizing operations can also be reduced, thereby efficiently recognizing the address.

According to a further aspect of the present invention, a connected pattern for which a separation position can be detected based on the size of the connected pattern can be selected.

Thus, the separation position is detected for only a relatively large connected pattern which probably contains contact characters. For a small connected pattern not regarded as containing contact characters, the detection of a separation position can be omitted, thereby improving the efficiency in address recognition.

According to a further aspect of the present invention, if the value of the minimum point of the histogram of the number of black picture elements in the input pattern is equal to or smaller than a predetermined value, it is defined as a separation point candidate.

As a result, a narrow portion of a character can be distinguished from a contact point between characters, and only the contact point between characters can be detected with high precision. Thus, a connected pattern can be separated at a contact point with high precision.

According to a further aspect of the present invention, if the height-to-width ratio of a separated pattern refers to an area out of a predetermined range, the separation point is removed from separation point candidates.

Thus, the connected pattern can be prevented from being separated into portions of size inappropriate when a key character is extracted, and can be prevented from being separated into patterns not containing a key character, thereby efficiently recognizing an address with wasteful processes omitted for a pattern not containing a key character.

According to a further aspect of the present invention, when characters are horizontally written, the positions of the multiples of the half width of the character of an average size is computed. When characters are vertically written, the positions of the multiples of the half height of the character of an average size is computed. And, only a minimum point within a predetermined range before and after the computed point is defined as a provisional separation point candidate among the minimum points of a histogram of the number of black picture elements.

Thus, a part of a key character can be efficiently extracted from among contact characters even if only the left or right part of the key character contacts with another character when characters are horizontally written, and even if only the upper or lower part of the key character contacts with another character when characters are vertically written, thereby efficiently restoring the original key character.

According to a further aspect of the present invention, a provisional separation point candidate is the minimum point having the value of the histogram of the number of black picture elements in the points within a predetermined range from the position of a multiple of a half size of an average character.

Thus, even if there are a plurality of minimum points having the minimum value of the histogram of the number of black picture elements in the points within a predetermined range from the position of a multiple of a half size of an average character, only one provisional separation point candidate can be extracted. As a result, processes can be prevented from being complicated by separating a connected pattern into a number of portions at positions not delimiting characters.

According to a further aspect of the present invention, a provisional separation point candidate is a point closest to the position of a multiple of a half size of an average character among the points having the minimum values of the histogram of the number of black picture elements.

Thus, even if there are a plurality of minimum points having the minimum value of the histogram of the number of black picture elements in the points within a predetermined range from the position of a multiple of a half size of an average character, only one provisional separation point candidate can be extracted. As a result, processes can be prevented from being complicated by separating a connected pattern into a number of portions at positions not delimiting characters.

According to a further aspect of the present invention, a key character can be extracted based on the result of integrating separated portions of a pattern.

Thus, even if only a part of a character contacts with another character, the part of the character can be separated from the other character, and the separated part of the character can be integrated into the remaining part of the character to form the original character, thereby preventing a key character from being mis-recognized.

According to a further aspect of the present invention, a place-name area can be extracted from among the key character candidates extracted from the input pattern by prioritizing a key character candidate ranking a higher order.

Thus, a character mis-extracted as a key character candidate can be prevented from being used in extracting a place-name area. As a result, the number of candidates to be extracted as place-name candidates can be reduced, and the number of times of the place-name recognizing processes can be reduced, thereby improving the efficiency in address recognition.

According to a further aspect of the present invention, a pattern information table of a key character candidate containing a key character level, a key character type, a hierarchical level, position coordinates, information as to whether or not a pattern is to be incorporated into an adjacent pattern is generated.

Thus, the process can be quickly performed by referring to the pattern information table to improve the efficiency in address recognition.

According to a further aspect of the present invention, it is determined whether or not the arrangement order and positions of key characters, or the combination of key characters are appropriate for the indication of addresses.

Therefore, even if a key character of an address is contained in characters which represent a place-name, the key character contained in the characters which represent the place-name can be removed from key characters to be extracted, so that a character only used to indicate the hierarchical level of the place-name can be extracted as a key character, thereby preventing a place-name area from being mis-extracted, and efficiently recognizing an address.

According to a further aspect of the present invention, when there is a key character specified by a partial selection item, a set of key character candidates is determined from a hierarchical level lower than the hierarchical level of the key character.

Thus, when a partial selection items are given to specify an address using, for example, a questionnaire postcard, the precision in key character extraction can be improved.

According to a further aspect of the present invention, when a set of key characters appropriate for an indication of an address cannot be obtained only by using a key character candidate ranking a higher order, a key character candidate ranking a lower order is added.

Thus, a place-name area can be correctly extracted, and the number of key character candidates can be limited to the smallest possible number.

According to a further aspect of the present invention, what is lacking in a set of key characters used to indicate that an address is selected among key character candidates ranking lower orders and is added to key character candidates.

Thus, only necessary candidates are selected as key character candidates from among key character candidates ranking lower orders so that key characters can be efficiently extracted.

According to a further aspect of the present invention, the key character level of a key character candidate extracted from a character string indicating an address is computed, and a set of key character candidates is determined by prioritizing key character candidates having higher key character levels.

Thus, when a set of key character candidates consistent in address hierarchical structure knowledge and in address key character position knowledge is determined, the processing time can be shortened by decreasing the number of sets of key character candidates, thereby efficiently recognizing an address.

According to a further aspect of the present invention, it is determined whether or not a combination of place-names indicating addresses or the arrangement order of place-names indicating an address are appropriate.

Thus, if a plurality of place-name candidates are indicated to a pattern of a place-name area and a plurality of address candidates can be obtained by combining the place-name candidates, then combinations of place-names not expressing actual addresses are deleted so that only existing addresses can be identified, thereby improving the precision in address recognition.

According to a further aspect of the present invention, an address recognition result obtained by checking in character units a pattern extracted from a character string indicating an address is also output.

As a result, even if a key character has not been successfully extracted, the address can be correctly recognized and the reliability in address recognition can be improved.

According to a further aspect of the present invention, the character type entered in the key character recognition dictionary is limited to the key character type and the character type similar to the key character type.

Therefore, when a key character is extracted from the pattern segmented from an input image, the number of comparisons between the pattern segmented from the input image and the character type entered in the key character recognition dictionary can be reduced much more than the case where all character types are entered in the key character recognition dictionary, thereby shortening the processing time in recognizing an address.

On the other hand, when only key character types are entered in the key character recognition dictionary, the key character types always rank first in number of occurrences in recognizing any pattern. Therefore, when a pattern to be recognized is similar to a key character, then a pattern which is not a key character may be mistakenly extracted as a key character. On the other hand, if character types similar to key character types are entered, then, for a pattern which is similar to, but is not, a key character, the character types similar to the key character type ranks first in number of occurrences. As a result, the key character type ranks lower. Therefore, it can be determined, by checking the occurrence order of the key character type, whether or not a pattern which is similar to, but is not, a key character belongs to the key character type. Thus, a pattern which is similar to, but is not, a key character can be prevented from being mistakenly extracted as a key character.

According to a further aspect of the present invention, if the ratio of the number K of the sample patterns containing the key character type in the N-th order as a result of the character recognition to the number M of the sample patterns processed for character recognition of a character type is equal to or larger than a predetermined value, the character type is defined as a similar character type of the key character type.

Thus, it is possible to specify, among various hand-written characters, a pattern of a non-key character frequently and mistakenly extracted as a key character, thereby determining a character type similar to the key character type with high precision.

BRIEF DESCRIPTION OF THE DRAWINGS

FIG. 6 is a block diagram showing the configuration of the address recognition apparatus according to the fourth embodiment of the present invention;

FIG. 8 is a flowchart showing the separation point determining and separating processes according to an embodiment of the present invention;

FIG. 14A shows a result of recognizing a single pattern obtained by provisional separation;

FIG. 14B shows a result of recognizing a pattern obtained by provisionally integrating a single pattern obtained by provisional separation into another pattern;

FIG. 15 shows an example of a pattern information table generated for the character string shown in FIG. 11A;

FIG. 16 shows a table showing the hierarchical levels of key characters;

FIG. 18A shows the hierarchical structure of the character strings used in addresses;

FIG. 18B shows a key character set available for the key character candidate shown in FIG. 17;

FIG. 20 shows an example of a pattern information table generated for a character string shown in FIG. 19;

FIG. 21A shows a key character candidate extracted from the character string shown in FIG. 19;

FIG. 21B shows a key character candidate re-extracted from the character string shown in FIG. 19;

FIG. 21C shows a key character set available for the character string shown in FIG. 19;

FIG. 22 shows a result of recognizing a key character type when the key character recognition dictionary according to an embodiment of the present invention is appropriately utilized;

FIG. 24 shows a key character type and a similar character type according to an embodiment of the present invention;

FIG. 25 shows a key character recognition result when the key character recognition dictionary which exclusively contains the key character type and its similar character types according to an embodiment of the present invention is used;

FIG. 26 is a block diagram showing the configuration of the address recognition apparatus according to the sixth embodiment of the present invention;

DESCRIPTION OF THE PREFERRED EMBODIMENTS

The address recognition apparatus according to an embodiment of the present invention is described below by referring to the attached drawings.

Figure 1:
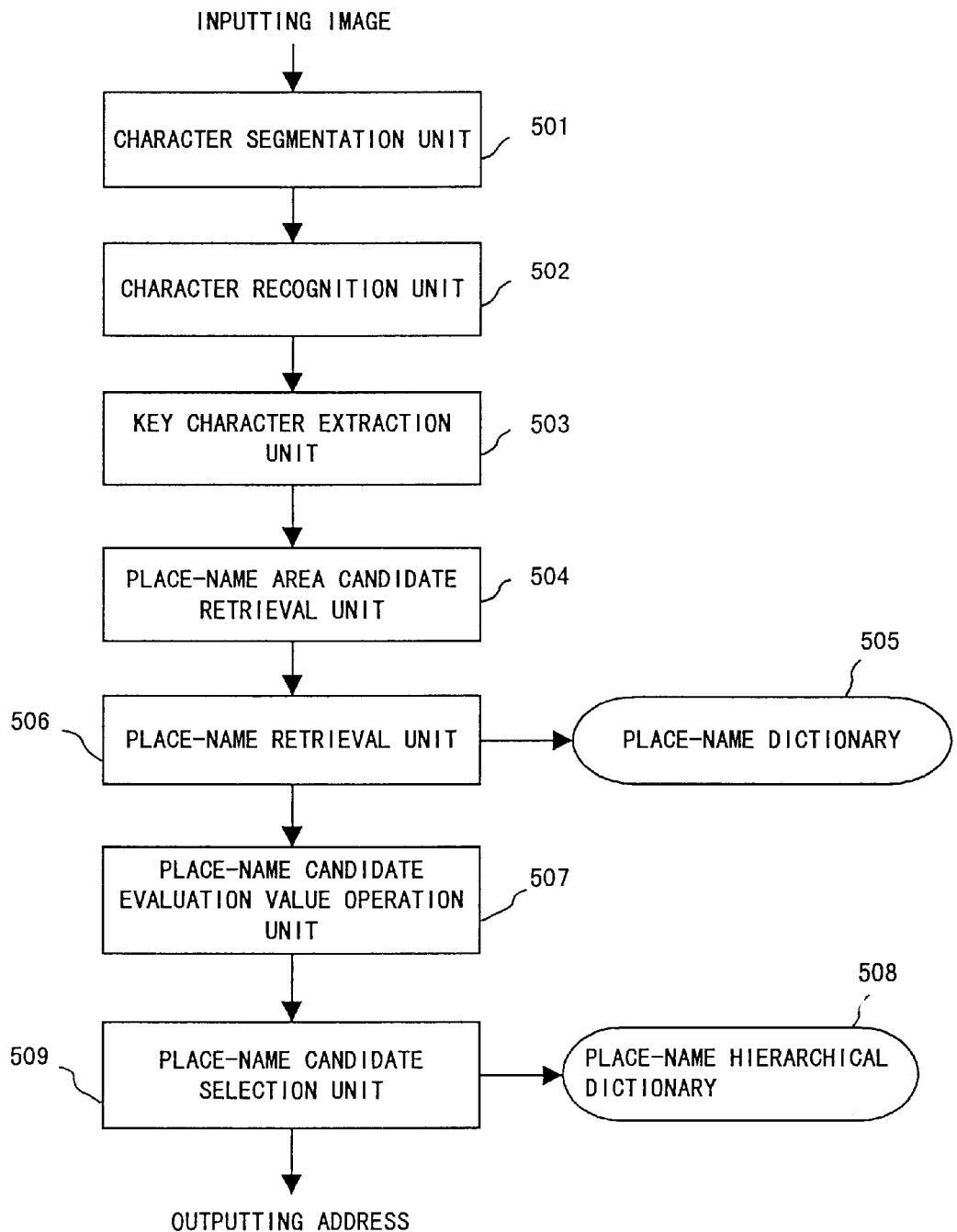
FIG. 1 is a block diagram showing the configuration of the conventional address recognition apparatus.
Figure 2:
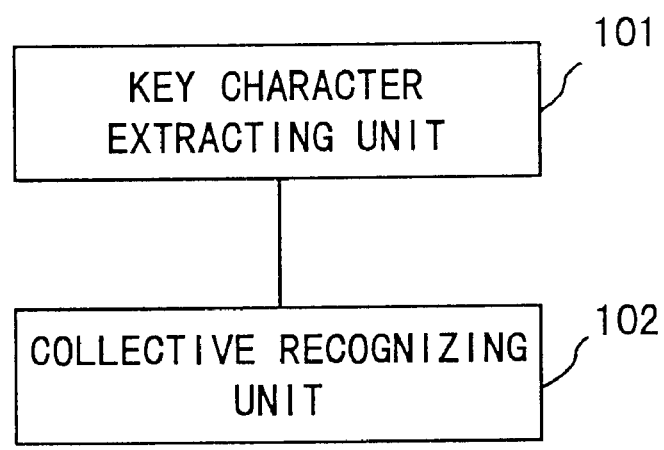
FIG. 2 is a block diagram showing the configuration of the address recognition apparatus according to the first embodiment of the present invention.

FIG. 2 is a block diagram showing the configuration of the address recognition apparatus according to the first embodiment of the present invention.

In FIG. 2, a key character extraction unit 101 extracts a key character from an input image. A collective recognition unit 102 collectively recognizes a pattern separated by a key character extracted by the key character extraction unit 101. The collective recognition can be performed by comparing the feature vector extracted from a pattern defined as a group separated by a key character with the feature vector of a group of characters or a character string representing a place-name word.

Thus, a pattern corresponding to one place-name word can be collectively segmented from an input image by extracting the key character from the input image and segmenting the pattern of the input image at the position of a key character. Furthermore, since an address can be efficiently recognized by collectively recognizing a collectively segmented pattern.

Figure 3:
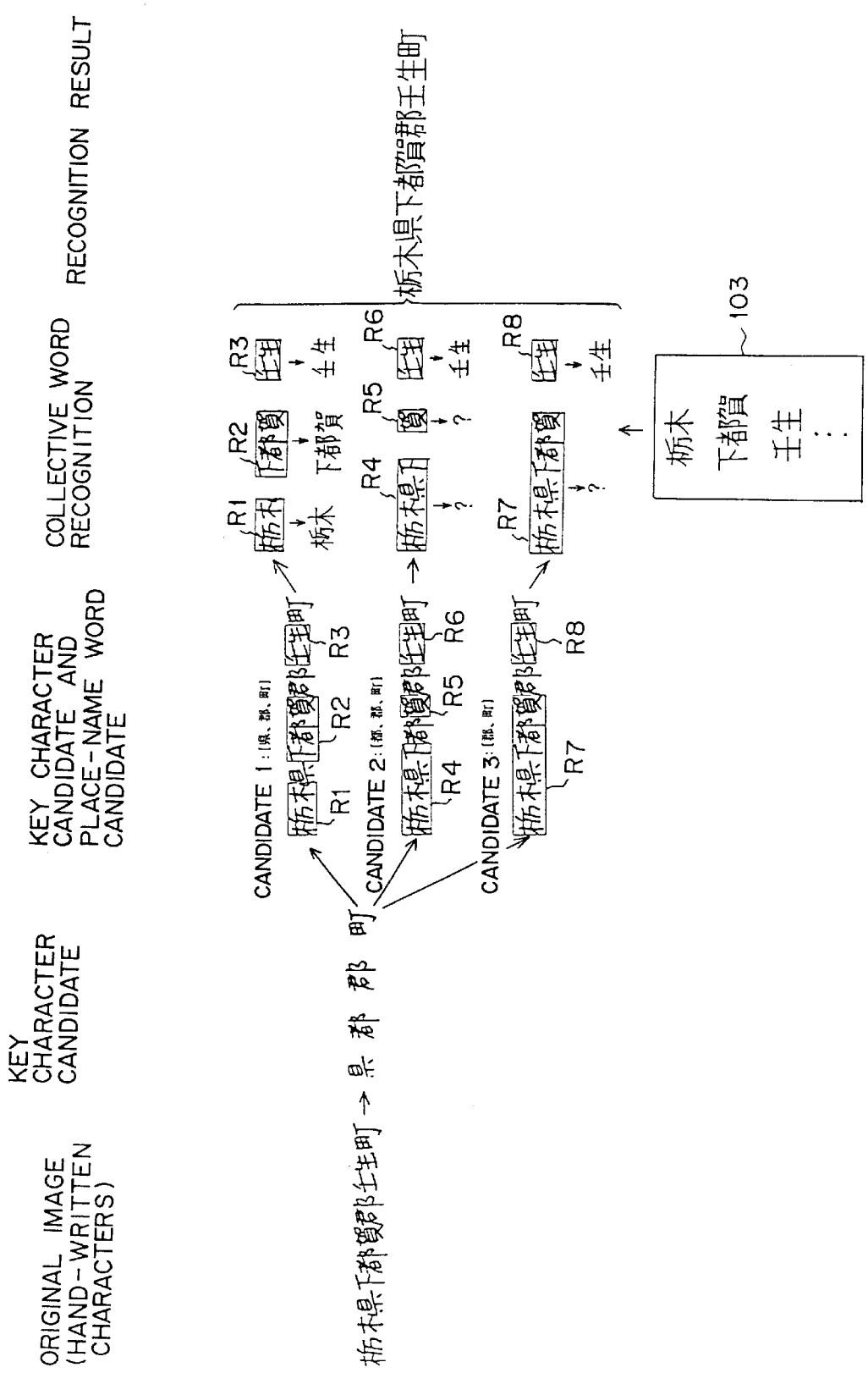
FIG. 3 is a diagram showing the address recognition method according to an embodiment of the present invention.

FIG. 3 shows a method of recognizing an address according to an embodiment of the present invention.

In FIG. 3, assuming that an original image of hand-written characters '栃木県下都賀郡壬生町' is input, a key character candidate is extracted from the pattern of the original image '栃木県下都賀郡壬生町'. As a result, '県', '都', '郡', '町' are extracted as key character candidates.

The key character candidates can be extracted by segmenting characters one by one from the pattern of the original image '栃木県下都賀郡壬生町' and recognizing the segmented pattern in character units.

When the key character candidates '県', '都', '郡', and '町' are combined, only a combination used as an actual address is obtained. As a result, the actual combinations of the key character candidates '県', '都', '郡', and '町' can be the key character set candidate {県, 郡, 町}, the key character set candidate {都, 郡, 町}, and the key character set candidate {郡, 町}.

Then, the pattern of the original image '栃木県下都賀郡壬生町' is separated at the position of each key character, and a pattern separated at the position of a key character is segmented from the original image.

As a result, for the key character set candidate {県, 郡, 町}, a segmentation area R1 containing the pattern of the original image '栃木', a segmentation area R2 containing the pattern of the original image '下都賀', and a segmentation area R3 containing the pattern of the original image '壬生' are obtained.

For the key character set candidate {都, 郡, 町}, a segmentation area R4 containing the pattern of the original image '下都賀', a segmentation area R5 containing the pattern of the original image '賀', and a segmentation area R6 containing the pattern of the original image '壬生' are obtained.

For the key character set candidate {郡, 町}, a segmentation area R7 containing the pattern of the original image '栃木県下都賀', and a segmentation area R8 containing the pattern of the original image '壬生' are obtained.

Next, for the key character set candidate {県, 郡, 町}, processes of collectively recognizing the patterns contained in the segmentation areas R1 through R3 segmented from the original image are performed. In this collective recognizing process, a feature vector of a group of characters or a character string indicating a place-name word is entered in a place-name word dictionary 103. Then, the pattern in each of the segmentation areas R1 through R3 of the original image is defined as a group. The feature vector extracted from the pattern is compared with the feature vector entered in the place-name word dictionary 103.

For example, assume that the place-name word dictionary 103 contains the feature vector corresponding to the plane-name word '栃木', the feature vector corresponding to the place-name word '下都賀', and the feature vector corresponding to the place-name word '壬生'. The feature vector of the pattern of the original image contained in the segmentation areas R1 through R3 is compared with the feature vector entered in the place-name word dictionary 103. As a result, the place-name word '栃木' is retrieved from the place-name word dictionary 103 because it is closer to the feature vector of the pattern of the original image contained in the segmentation area R1. Thus, the place-name word '栃木' is output as the result of recognizing the pattern of the original image contained in the segmentation area R1. The place-name word '下都賀' is retrieved from the place-name word dictionary 103 because it is closer to the feature vector of the pattern of the original image contained in the segmentation area R2. Thus, the place-name word '下都賀' is output as the result of recognizing the pattern of the original image contained in the segmentation area R2. The place-name word '壬生' is retrieved from the place-name word dictionary 103 because it is closer to the feature vector of the pattern of the original image contained in the segmentation area R3. Thus, the place-name word '壬生' is output as the result of recognizing the pattern of the original image contained in the segmentation area R3.

For key character set candidate {都, 郡, 町}, processes of collectively recognizing the patterns contained in the segmentation areas R4 through R6 segmented from the original image are performed. That is, the feature vectors of the patterns of the original images contained in the segmentation areas R4 through R6 are compared with the feature vectors entered in the place-name word dictionary 103. Since the place-name '下都賀' contained in the segmentation area R4 does not actually exist, the place-name word dictionary 103 does not store the feature vector corresponding to the place-name word '下都賀'. As a result, nothing can be retrieved from the place-name word dictionary 103 as a place-name word close to the feature vector of the pattern of the original image contained in the segmentation area R4, thereby outputting a result 'non-recognizable'.

Since the place-name word '賀' contained in the segmentation area R5 does not actually exist, the place-name word dictionary 103 does not store the feature vector corresponding to the place-name word '賀'. As a result, nothing can be retrieved from the place-name word dictionary 103 as a place-name word close to the feature vector of the pattern of the original image contained in the segmentation area R5, thereby outputting a result 'non-recognizable'.

The place-name word '壬生' is retrieved from the place-name word dictionary 103 because it is closer to the feature vector of the pattern of the original image contained in the segmentation area R6. Thus, the place-name word '壬生' is output as the result of recognizing the pattern of the original image contained in the segmentation area R6.

For the key character set candidate {都, 町}, processes of collectively recognizing the patterns contained in the segmentation areas R7 and R8 segmented from the original image are performed. That is, the feature vectors of the patterns of the original images contained in the segmentation areas R7 and R8 are compared with the feature vectors entered in the place-name word dictionary 103. Since the place-name '栃木県下都賀' contained in the segmentation area R7 does not actually exist, the place-name word dictionary 103 does not store the feature vector corresponding to the place-name word '栃木県下都賀'. As a result, nothing can be retrieved from the place-name word dictionary 103 as a place-name word close to the feature vector of the pattern of the original image contained in the segmentation area R7, thereby outputting a result 'non-recognizable'.

The place-name word '壬生' is retrieved from the place-name word dictionary 103 because it is closer to the feature vector of the pattern of the original image contained in the segmentation area R8. Thus, the place-name word '壬生' is output as the result of recognizing the pattern of the original image contained in the segmentation area R8.

As a result of the process of collectively recognizing a place-name word, the result of 'non-recognizable place-name word' is output for the key character set candidate {都, 郡, 町} and the key character set candidate {都, 町}. Therefore, these key character set candidates are rejected, and the key character set candidate {県, 郡, 町} is selected. As a result, for the pattern of the hand-written original image {栃木県下都賀郡壬生町} the result of recognizing the address '栃木県下都賀郡壬生町' can be output.

Figure 4:
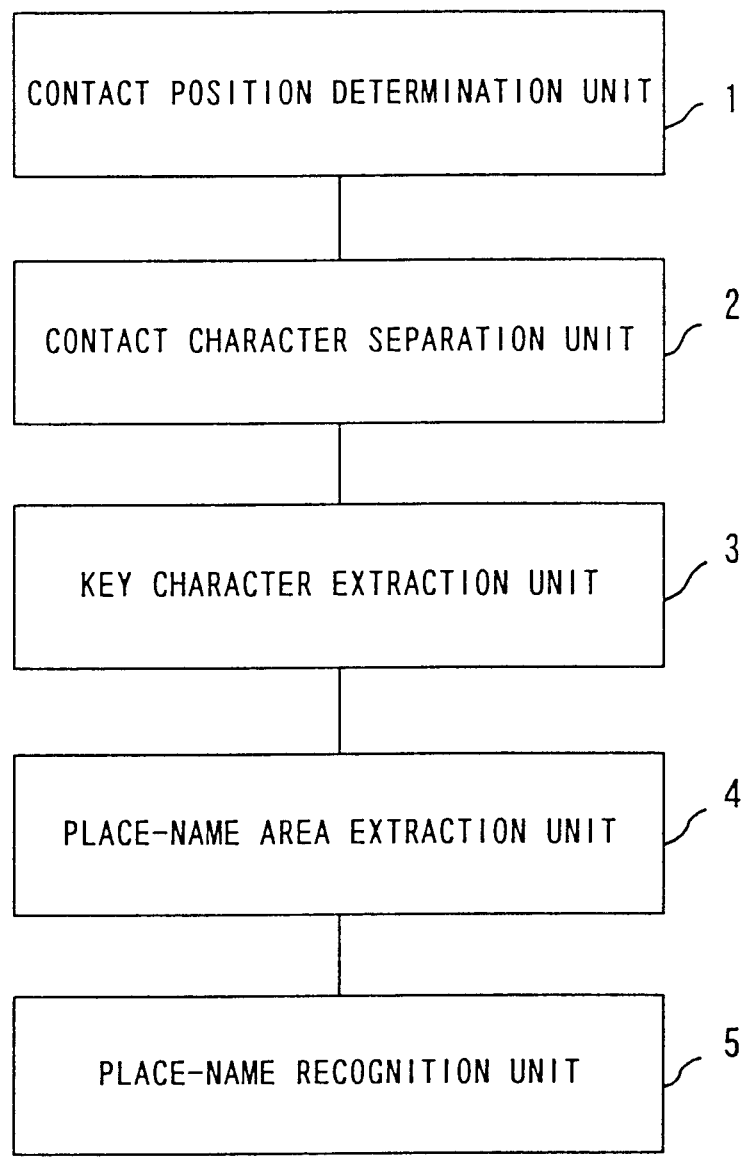
FIG. 4 is a block diagram showing the configuration of the address recognition apparatus according to the second embodiment of the present invention.

FIG. 4 is a block diagram of the configuration of the address recognition apparatus according to the second embodiment of the present invention. In FIG. 4, a contact position determination unit 1 determines the contact position of contact characters. A contact character separation unit 2 separates contact characters at a contact position determined by the contact position determination unit 1. A key character extraction unit 3 extracts a key character based on the result of separating the contact characters by the contact character separation unit 2. A place-name area extraction unit 4 extracts a place-name area based on the position of the key character extracted by the key character extraction unit 3. The place-name recognition unit 5 recognizes the place-name of the place-name area extracted by the place-name area extraction unit 4 based on the state of the contact characters before separation.

When a pattern to be recognized for an address is input, the contact point of the contact characters is determined and the contact characters are separated. When the contact characters are separated, each of the separated characters is recognized and a key character is extracted. When the key character is extracted, the pattern delimited by the key character is collectively taken out, and the feature vector of the entire pattern delimited by the key character is compared with the feature vector of the place-name, thereby recognizing the place-name.

Thus, an input pattern can be prevented from being divided into a number of portions in areas other than key character areas by using the contact character pattern separating process in the key character extracting process. As a result it can be avoided that a large number of patterns to be recognized are generated. Therefore, the times of the recognizing processes can be reduced, and the key character can be efficiently extracted.

Furthermore, it is not necessary to character-by-character segment a pattern to be delimited by a key character by collectively recognizing the entire pattern to be delimited by a key character. Thus, the process can be simple and mis-recognition from mis-positioning of pattern separation position can be avoided, and the correctness in address recognition can be successfully improved.

Additionally, since the entire pattern delimited by a key character is collectively processed, the number of place-name candidates can be smaller than in the case where all place-names matching any one character in the pattern delimited by a key character are retrieved, thereby efficiently performing the process.

Figure 5:
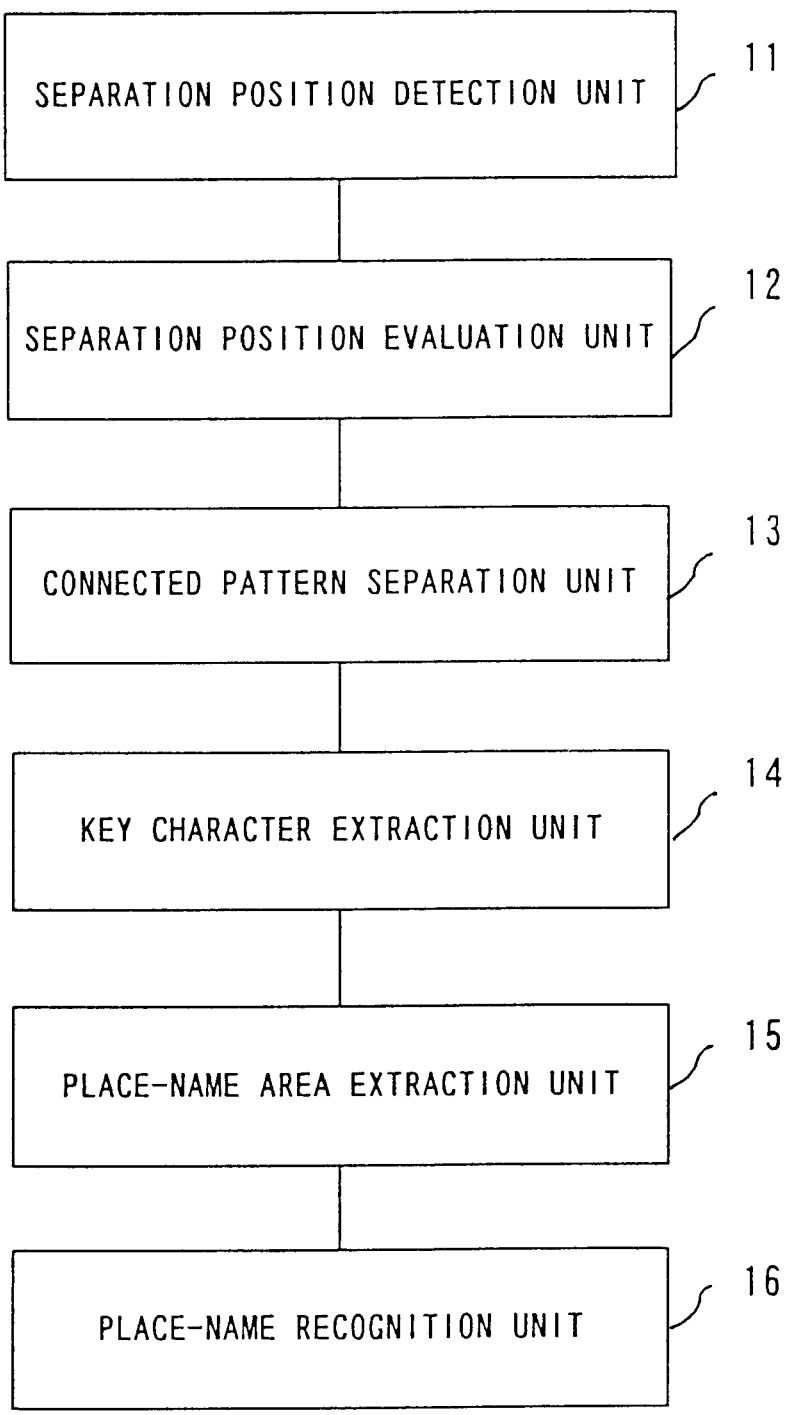
FIG. 5 is a block diagram showing the configuration of the address recognition apparatus according to the third embodiment of the present invention.

FIG. 5 is a block diagram showing the configuration of the address recognition apparatus according to the third embodiment of the present invention.

In FIG. 5, a separation position detection unit 11 detects the separation position of a connected pattern. A separation position evaluation unit 12 evaluates the separation position detected by the separation position detection unit 11 based on the size of the input pattern. The connected pattern separation unit 13 separates a connected pattern based on the evaluation result by the separation position evaluation unit 12. A key character extraction unit 14 extracts a key character based on the separation result of the connected pattern by the connected pattern separation unit 13. The place-name area extraction unit 15 extracts a place-name area based on the position of the key character extracted by the key character extraction unit 14. The place-name recognition unit 16 recognizes the place-name of the place-name area extracted by the place-name area extraction unit 15.

When a pattern to be recognized for an address is input, a pattern to be separated is specified. Then, the histogram of the number of black picture elements of the pattern to be separated is computed. In the minimum points having the smallest value of the histogram of the number of black picture elements, the point having a value equal to or smaller than a predetermined value is defined as a separation point candidate. When the pattern is separated at the positions of all separation point candidates, a pattern is divided into a number of small portions at positions which do not relate to the extraction of a key character. As a result, the amount of the precesses is increased. Therefore, the point related to the extraction of a key character from among the separation point candidates is selected. Practically, an area in which the height-to-width ratio when a pattern is separated is within a predetermined range is detected, and a separation point candidate not within the area is excluded from the separation position. As a result, the area corresponding to the size of the key character can be segmented as a character area, thereby performing an efficient process.

FIG. 6 is a block diagram showing the configuration of the address recognition apparatus according to the fourth embodiment of the present invention.

In FIG. 6, a key character candidate extraction unit 21 extracts a key character candidate from an input pattern. A ranking unit 22 ranks a key character candidate based on the recognition result of the key character candidate extracted by the key character candidate extraction unit 21. A place-name area extraction unit 23 extracts a place-name based on the position of the key character candidate ranking higher through the ranking unit 22. A place-name recognition unit 24 recognizes the place-name of the place-name area extracted by the place-name area extraction unit 23.

When a pattern to be recognized for an address is input, a key character candidate is extracted from the input pattern. In the extraction of a key character candidate, a handwritten character may be mis-recognized and a non-key character may be extracted as a key character candidate. If such mis-recognition occurs, the number of patterns extracted as key character candidates increases and the entire processing time is extended. Therefore, a key character level is defined based on the distance and order of a recognition result, and uses by priority a key character candidate having a larger key character level as a key character candidate. As a result, the pattern mis-extracted as a key character candidate is excluded from key character candidates, and the number of candidates for a place-name area can be decreased, thereby efficiently performing the processes.

Figure 7:
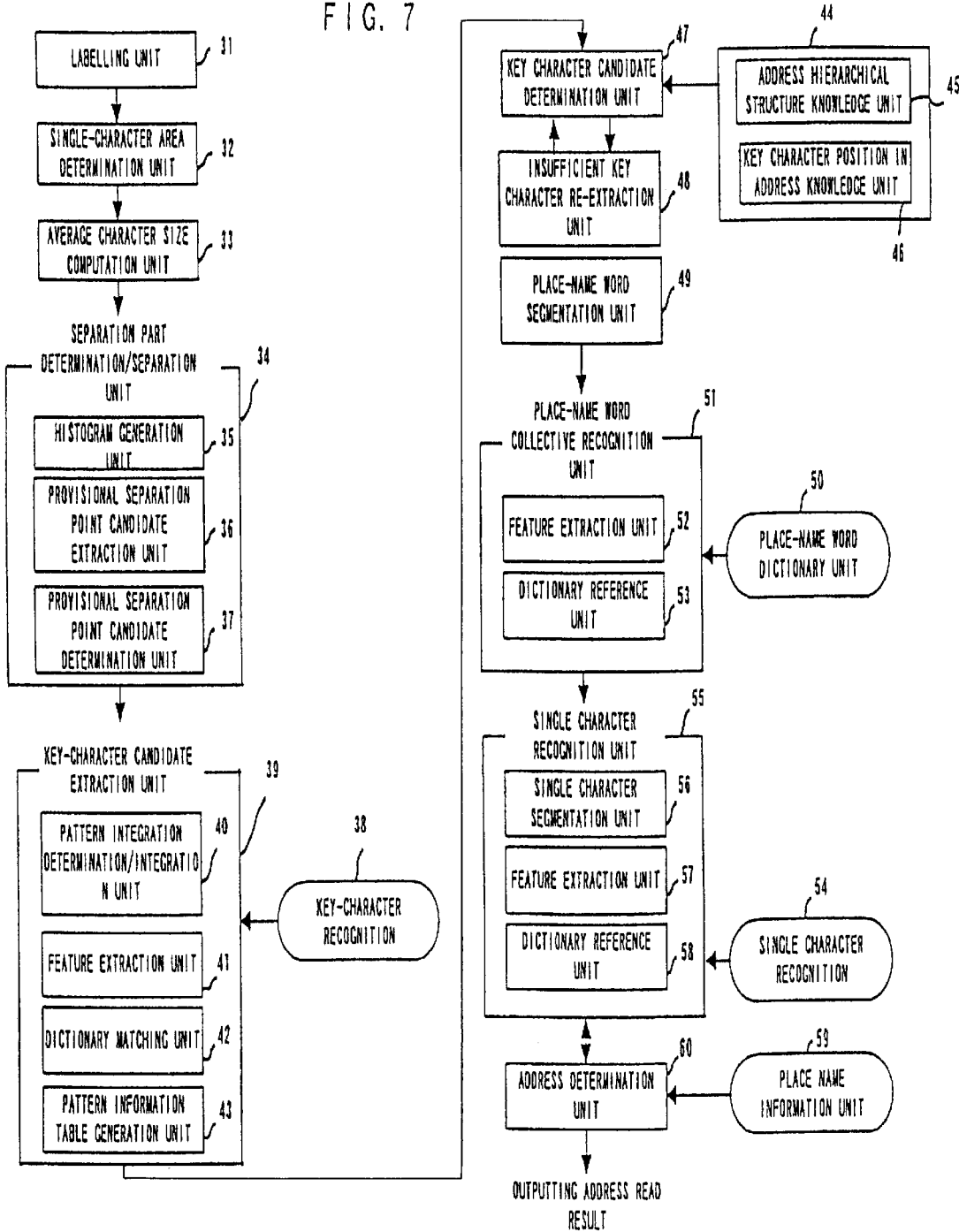
FIG. 7 is a block diagram showing the configuration of the address recognition apparatus according to the fifth embodiment of the present invention.

FIG. 7 is a block diagram showing the configuration of the address recognition apparatus according to the fifth embodiment of the present invention. The address recognition apparatus can be used when, for example, an address horizontally represented by free handwritten characters in a collective character box, not individual character boxes on a questionnaire, a user entry card, a mail order card, etc. is read by an optical character recognition device (OCR).

In FIG. 7, a labelling unit 31 labels for each of the connected elements a pattern segmented after an address area is extracted from a binarized image read using a scanner, etc.

A single-character area determination unit 32 integrates connected patterns from the size of a labelled connected pattern, the distance from an adjacent pattern, etc., and obtains a single character area.

A average character size computation unit 33 computes an average character size by removing a pattern larger or smaller than other patterns such as contact characters, etc.

A contact portion determination/separation unit 34 comprises a histogram generation unit 35, a provisional separation point candidate extraction unit 36, and a provisional separation point determination unit 37.

The histogram generation unit 35 determines the possibility that characters of a pattern are contact with each other based on the ratio of the width of a pattern to the width of an average character when characters are horizontally written; the ratio of the height of a pattern to the height of an average character when characters are vertically written; and the height-to-width ratio, etc. of the enclosing rectangle of a pattern. When it is determined that the pattern contains contact characters, the number of black picture elements is counted in the direction vertical to the character string, and a histogram of the number of black picture elements is generated after being smoothed using a moving average.

The provisional separation point candidate extraction unit 36 detects a minimum point from the histogram of the number of black picture elements generated by the histogram generation unit 35, and defines as a provisional separation point candidate a point having the minimum point value, equal to or smaller than a threshold, of the histogram of the number of black picture elements.

When the characters of a target pattern are horizontally written, the provisional separation point determination unit 37 determines that there is the strongest possibility that characters contact each other at the point a multiple of ½ of the average character width horizontally distant from the end point of the enclosing rectangle of the pattern, and defines that a provisional separation point candidate within a predetermined range from the point is a provisional separation point. When there are a plurality of provisional separation point candidates within the predetermined range from the point a multiple of ½ of the average character width from the end point, a point having the smallest value of the histogram of the number of black picture elements is defined as a provisional separation point. If there are a plurality of points having the smallest values of the histogram of the number of black picture elements, then point closest to the point a multiple of ½ of the average character width from the end point is defined is defined as a provisional separation point.

When the characters of a target pattern are vertically written, there is the strongest possibility that characters contact each other at the point of a multiple of ½ of the average character height vertically distant from the end point of the enclosing rectangle of the pattern, and a provisional separation point candidate within a predetermined range from the point is defined as a provisional separation point. When there are a plurality of provisional separation point candidates within the predetermined range from the point a multiple of ½ of the average character width from the end point, a point having the smallest value of the histogram of the number of black picture elements is defined as a provisional separation point. If there are a plurality of points having the smallest values of the histogram of the number of black picture elements, then the point closest to the point a multiple of ½ of the average character height from the end point is defined as a provisional separation point.

When a provisional separation point can be obtained, the pattern is provisionally separated by a straight line or a curve passing through the provisional separation point.

A key-character recognition dictionary 38 stores a feature vector of a character relating to an address.

A key character candidate extraction unit 39 comprises a pattern integration/determination and integration unit 40, a feature extraction unit 41, a dictionary reference unit 42, and a pattern information table generation unit 43.

When adjacent patterns are integrated in order from the start of a character string, the pattern integration determination/integration unit 40 determines whether or not the integrated pattern can be a character based on the width and the height of the integrated pattern. If it is determined that there is the possibility that the integrated pattern is a character, then a provisional pattern can be generated by provisionally integrating the pattern into an adjacent pattern.

The feature extraction unit 41 extracts a feature of a single pattern only for a pattern which cannot be integrated. For a pattern which can be integrated, features are extracted from both a single pattern and an integrated pattern.

For a pattern which cannot be integrated, the dictionary reference unit 42 outputs the first through the Nth candidate character types by comparing the feature vector of a single pattern with that of a the character entered in the key-character recognition dictionary 38. For a pattern which can be integrated, the dictionary reference unit 42 outputs the first through the Nth candidate character types for each of a single pattern and an integrated pattern by comparing each feature vector of the single pattern and the integrated pattern with the feature vector of a character entered in the key-character recognition dictionary 38.

A pattern information table generation unit 43 obtains the distance of the candidate character types from the first through the Nth candidate character types. When a key character is contained in these candidate character types, the key character level is computed based on the distance of the candidate character type corresponding to the key character and the occurrence order.

For example, the key character level can be defined by a difference level or similarity when a pattern is recognized.

When the key character level is defined by the difference level, the following function is used.

A difference level refers to the rate at which the possibility that a character type is entered in the dictionary is lower when a larger value is indicated as a value of the distance between the feature vector of the pattern to be recognized and the feature vector of the character type entered in the dictionary. Assume that the key character level of a pattern to the key character type k is fk. The fk is a function of the difference level d between a pattern and the key character type k. The characteristics of fk are described as follows.

a. When a pattern has the highest key character level to the key character type k, the function has a value of 1. When it has the lowest key character level, the function has a value of 0. That is, since fk has a value of 1 when the difference level d between a pattern and the key character type k is the minimum value dmin, and has a value of 0 when the key character type k is the maximum value dmax, the following conditions are satisfied.

fk (dmin)=1 fk (dmax)=0

$0 \leq fk\ (d) \leq 1$ where $dmin \leq d \leq dmax$.

b. When the difference level d is constant, the key character level becomes lower when the occurrence order of the target key character type is lower among the recognition candidates.

c. When the difference level is equal to the occurrence order among recognition candidates, and the occurrence order of a target key character type is not the first among the recognition candidates, the key character level is the lower when the difference between the difference level from the first order character type and the difference level from the key character type is the larger.

The function which satisfies the above described three characteristics can be represented as follows.

fk (di)=1/{1+ix((d1−di)/dc)×(di/dc)} where $0 \leq di \leq \infty$

In the equation above, i indicates the occurrence order of the key character type k among the candidate character types as a recognition result, di indicates the difference level then, and dc indicates a constant appropriately determined through experiment.

If the key character level is defined by the similarity, the following function is used.

The similarity refers to the rate at which the possibility that a pattern is a character type k is lower when a smaller value is indicated. When the similarity is used, the fk is a function of the similarity s between a pattern and the key character type k. The characteristics of fk are described as follows.

a. When a pattern has the highest key character level to the key character type k, the function has a value of 1. When it has the lowest key character level, the function has a value of 0. That is, since fk has a value of 1 when the similarity level s between a pattern and the key character type k is the maximum value smax, and has a value of 0 when the key character type k is the minimum value smin, the following conditions are satisfied.

fk (smax)=1 fk (smin)=0

$0 \leq fk\ (s) \leq 1$ b. When the similarity is constant, the key character level becomes lower when the occurrence order of the target key character type is lower among the recognition candidates.

c. When the difference level is equal to the occurrence order among recognition candidates, and the occurrence order of a target key character type is not the first among the recognition candidates, the key character level is the lower when the difference between the similarity to the first order character type and the similarity to the key character type is the larger.

The function which satisfies the above described three characteristics can be represented as follows.

$$fk(di)=(si/sc)/\{1+ix((si-s1)/sc)\}$$

where $0 \leq fk \leq 1$, $0 \leq si < 1$

In the equation above, i indicates the occurrence order of the key character type k among the candidate character types as a recognition result, si indicates the similarity then, and sc indicates a constant appropriately determined through experiment.

If the key character level is computed, then a character having a key character level equal to or higher than a threshold is defined as a key character candidate, and a character having a key character level not zero and lower than the threshold is defined as a semi-key character candidate. The information such as the above described key character level, the key character type having a key character level other than 0, the existence of provisional separation and integration, the coordinates of the enclosing rectangle in an image, etc. is entered in the pattern information table.

An address knowledge unit 44 comprises an address hierarchical structure knowledge unit 45 and a key character position in address knowledge unit 46.

The address hierarchical structure knowledge unit 45 enters the address hierarchical structure knowledge about the hierarchical structure of a key character such as '都' (capital city), '道' (prefecture), '府' (prefecture), '県' (prefecture), '市' (city), '町' (town), '村' (village), '郡' (county), etc. For example, the information that only the key characters '町' (town) and '村' (village) come after the key character '郡' (county) which never come before the key character '区' (ward) or '市' (city) is entered. In the address hierarchical structure knowledge, the characters having the highest hierarchical levels such as '都' (capital city), '道' (prefecture), '府' (prefecture), or '県' (prefecture) can be omitted.

The key character position in address knowledge unit 46 enters the key character position in address knowledge relating to a possible arrangement position of a key character in the address. For example, it stores the information that a key character never appears as a leading character of an address, that key characters never appear adjacently, that the number of characters containing the key character '県' (prefecture) as a trailer is 3 or 4, etc.

A key character candidate determination unit 47 reads the address hierarchical structure knowledge and the key character position in address knowledge respectively from the address hierarchical structure knowledge unit 45 and the key character position in address knowledge unit 46. Then, the key character candidate determination unit 47 defines, as a set of key character candidates, characters consistent with the address hierarchical structure knowledge and the key character position in address knowledge in all sets of extracted key characters. If no key character candidates are determines, then it transmits the information about the hierarchy and the character type of insufficient key characters to an insufficient key character re-extraction unit 48, and requests the re-extraction of the key character candidates. When the insufficient key character re-extraction unit 48 successfully re-extracts a key character candidate, it determines a set of key character candidates including the key character candidate re-extracted by the insufficient key character re-extraction unit 48. When the set of key character candidates is determined, the provisionally separated or integrated characters are actually separated or integrated.

When the insufficient key character re-extraction unit 48 cannot determine a set of a key character candidate by detecting a set of key character candidates consistent with the address hierarchical structure knowledge and the key character position in address knowledge only by using a key character candidate entered in the pattern information table, it re-extracts as a key character candidate a pattern containing the key character types in the insufficient hierarchical level in the first through the Nth recognition result in the semi-key character candidate entered in the pattern information table.

A place-name word segmentation unit 49 segments as a place-name word pattern each of all patterns from the first character of an address through the character immediately before the first key character, and each of all patterns enclosed by the second and subsequent key characters.

A place-name word dictionary unit 50 enters a feature vector of a place-name in Japan. The feature vector of a place-name entered in the place-name word dictionary unit 50 represents a group of characters or a character string indicating a place-name. The feature vector of a place-name can be extracted from a learning pattern.

A place-name word collective recognition unit 51 comprises a feature extraction unit 52 and a dictionary reference unit 53.

The feature extraction unit 52 extracts a feature vector from each of the place-name word patterns existing between the start of a line and a key character, and the place-name word patterns existing between key characters.

The dictionary reference unit 53 outputs a place-name candidate by comparing the feature vector of the place-name word pattern extracted by the feature extraction unit 52 with the feature vector of the place-name entered from the place-name word dictionary unit 50.

A single character recognition dictionary unit enters the feature vector of each character.

A single character recognition unit 55 comprises a single character segmentation unit 56, a single character segmentation unit 56, and a dictionary reference unit 58. When a pattern which is neither a character string representing a place-name such as '丁目', '番地', '方書', etc. nor a key character is read, the pattern is segmented character by character to recognize a single character.

The single character segmentation unit 56 segments a character from the input pattern.

The feature extraction unit 57 extracts a feature vector of the pattern segmented by the single character segmentation unit 56.

A dictionary reference unit 58 recognizes each character by comparing the feature vector extracted by the feature extraction unit 57 with the feature vector of a character entered in the single character recognition dictionary unit 54.

A place-name information unit 59 stores place-name knowledge as to whether or not a combination of place-names expressed as an address is acceptable, or whether or not the order of the place-names expressed as an address is appropriate. The place-name information unit 59 can encode and store an existing place-name.

An address determination unit 60 checks whether or not a place-name candidate output from the place-name word collective recognition unit 51 is consistent with the preceding or subsequent place-name candidate by referring to the place-name information unit 59.

Thus, all patterns containing key character types in the first through the Nth patterns are not defined as key character candidates, but the key character level is defined based on both distance of the recognition result and order of the key characters. Then, only from among patterns having a high key character level, a set of key character candidates consistent with the address hierarchical structure knowledge and the key character position in address knowledge is obtained. Only when a set of key character candidates consistent with the address hierarchical structure knowledge and the key character position in address knowledge cannot be obtained because of insufficient key character types, the pattern containing a key character type at an insufficient hierarchical level in the recognition result is re-extracted from among patterns at lower key character levels. As a result, the number of sets of candidates can be small enough to suppress the possibility of the mis-matching and perform an efficient process.

Furthermore, the contact process, the separating process, and the integrating process are applied only to the key character extracting process. To recognize a place-name word pattern, the place-name word patterns are collectively processed. Thus, a key character can be correctly extracted even when the key characters contact with each other. The contact process, the separating process, and the integrating process are omitted for the place-name patterns to perform the recognizing process, thereby efficiently performing the process.

When a place-name pattern is recognized, it is not recognized after being separated in character units, but place-name word patterns are collectively processed to extract a feature and refer to a dictionary. Thus, mis-segmentation and mis-recognition occurring when a place-name word pattern is separated can be avoided, and the recognition rate can be improved. For example, even when an address contains a delimiter such as '川', the mis-recognition by mis-segmentation can be avoided. As a result, the precision in reading an address can be improved even when a free-pitch handwritten address image of, for example, a user entry card, a questionnaire post card, etc. contains contact characters.

When a key character cannot be read because it is unique, the reliability in address recognition can be improved by outputting a direct read result by operating the single character recognition unit 55.

FIG. 8 is a flowchart showing the separation part determining/separating process according to an embodiment of the present invention.

In FIG. 8, the separation part determination/separation unit 34 computes the height-to-width ratio on the pattern of a single-character area determined by the single-character area determination unit 32 (step S1). When the height-to-width ratio of a pattern is smaller than a threshold, it is considered that the pattern has no possibility of contact with other characters, and the pattern is excluded from the candidates to be separated (step S2).

On the other hand, when the height-to-width ratio of a pattern is equal to or larger than the threshold, the histogram generation unit 35 predicts the number of contact characters based on the height-to-width ratio of the pattern (step S3), and generates the histogram of the number of black picture elements of the pattern (step S4).

Then, the provisional separation point candidate extraction unit 36 detects the minimum point of the histogram of the number of black picture elements generated by the histogram generation unit 35 (step S5), and defines as a provisional separation point candidate a point having the value of the minimum point equal to or smaller than the threshold.

For a pattern in which a provisional separation point candidate has been detected, the provisional separation point candidate determination unit 37 extracts a point a multiple of ½ of the average character width horizontally distant from the start point of the enclosing rectangle of the pattern when characters are horizontally written, and a point a multiple of ½ of the average character height vertically distant from the start point of the enclosing rectangle of the pattern when characters are vertically written. A provisional separation point candidate within a predetermined range from these point is defined as a provisional separation point (step S6).

The separation part determination/separation unit 34 provisionally separates the pattern by a straight line or a curve passing through a provisional separation point (step S8) when the number of provisional separation points determined by the provisional separation point candidate determination unit 37 is larger than 0 (step S7). The separation part determination/separation unit 34 does not provisionally separate the pattern when the number of provisional separation points determined by the provisional separation point candidate determination unit 37 is 0.

Figure 9:
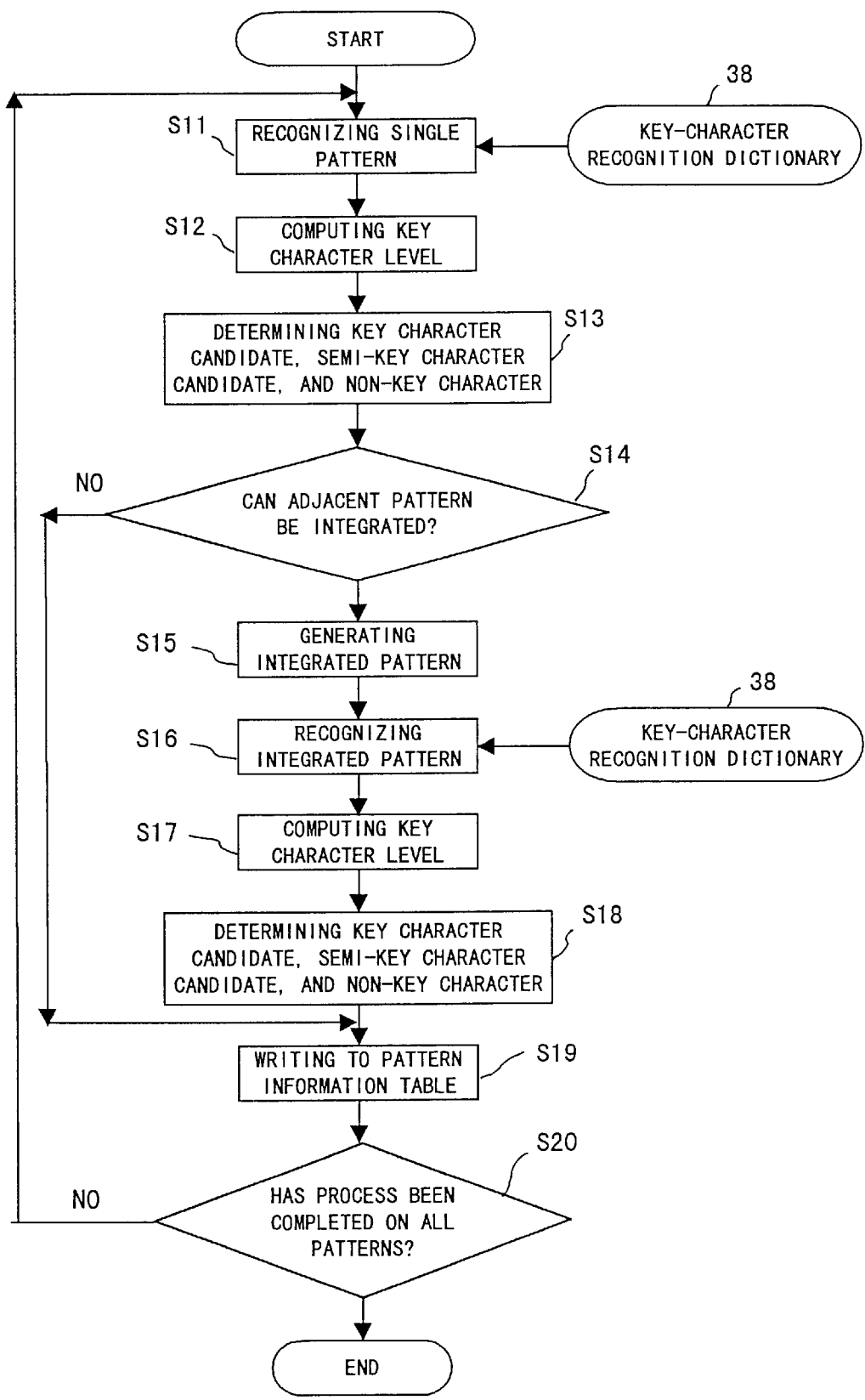
FIG. 9 is a flowchart showing the key character candidate extracting process according to an embodiment of the present invention.

FIG. 9 is a flowchart showing the key-character candidate extracting process according to an embodiment of the present invention.

In FIG. 9, the key-character candidate extraction unit 39 recognizes a single pattern by individually processing patterns obtained by the provisional separation (step S11). When a single pattern is recognized, the key-character recognition dictionary 38 is referred to, and the pattern obtained by the provisional separation is compared with the pattern entered in the key-character recognition dictionary 38 so that the first through the Nth order candidate character types are output.

Then, using a recognition result about a single pattern, the key character level of a single pattern is computed (step S12).

Based on the key character level of a single pattern, it is determined whether the single pattern belongs to a key character candidate, a semi-key character candidate, or a non-key character (step S13).

When an adjacent pattern is integrated into a single pattern, the pattern integration determination/integration unit 40 determines based on the width and height of the integrated pattern whether or not the integrated pattern can be a character (step S14). If the integrated pattern can be a character, a provisional integrated pattern can be generated by provisionally integrating the single pattern into the adjacent pattern (step S15).

Then, the integrated pattern is compared with the pattern entered in the key-character recognition dictionary 38 so that the first through the Nth order candidate character types are output (in step S16).

Then, using a recognition result about an integrated pattern, the key character level of the integrated pattern is computed (step S17).

Based on the key character level of an integrated pattern, it is determined whether the integrated pattern belongs to a key character candidate, a semi-key character candidate, or a non-key character (step S18).

Then, for each of a single pattern and an integrated pattern, the pattern information table generation unit 43 enters information such as a key character level, a key character type having the key character level other than 0, existence of a provisional separation or integration, the coordinates of an enclosing rectangle in an image, etc. in the pattern information table (step S19).

It is determined whether or not the above described processes have been performed on all patterns after the provisional separation (step 20). If the processes have not been performed on all patterns, then control is returned to step S11, and the processes are repeated (step S20).

Figure 10:
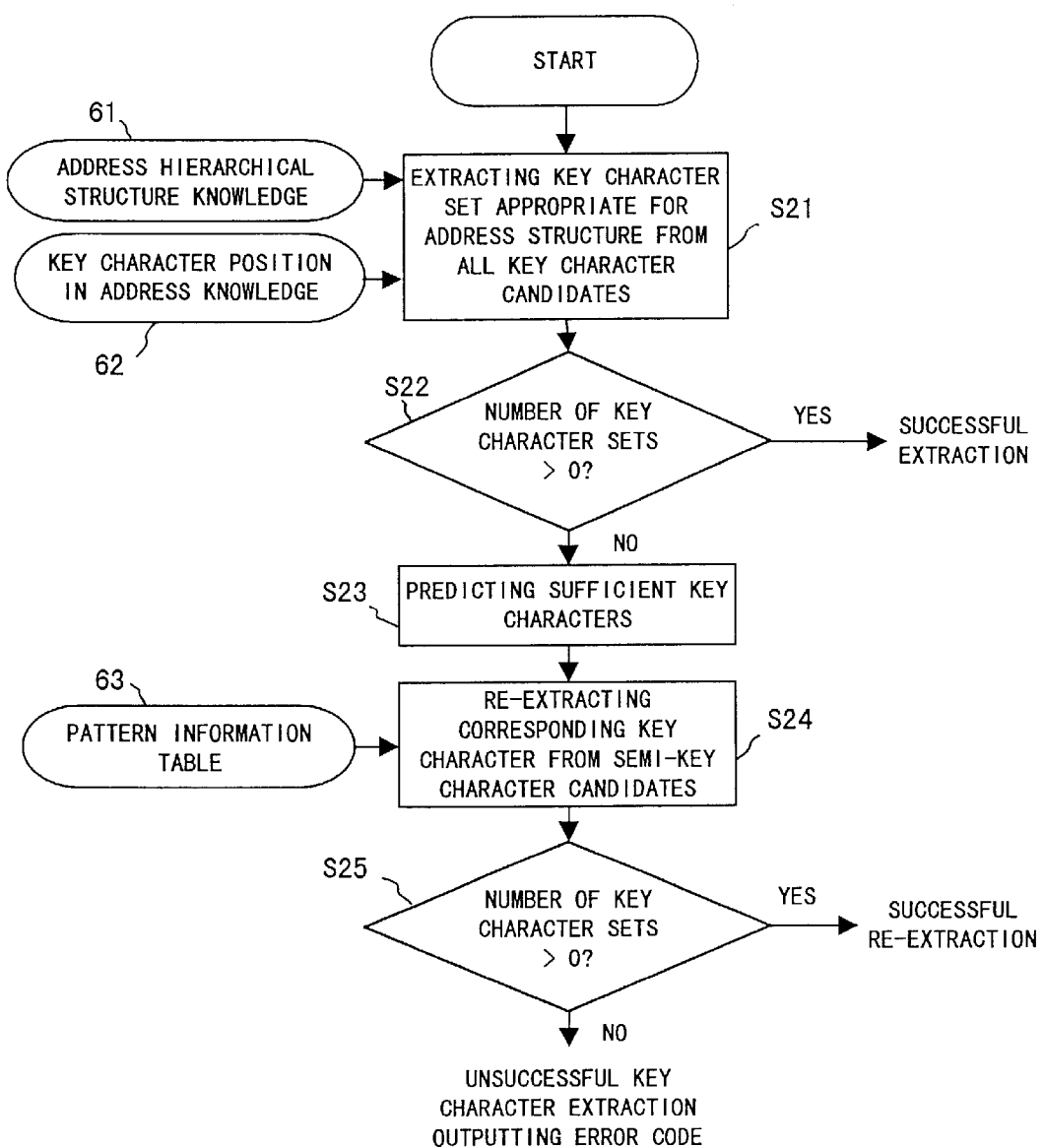
FIG. 10 is a flowchart showing the key character candidate determining process and the key character re-extracting process according to an embodiment of the present invention.

FIG. 10 is a flowchart showing the key character candidate determining process and the key character re-extracting process according to an embodiment of the present invention.

In FIG. 10, the key character candidate determination unit 47 refers to an address hierarchical structure knowledge 61 in the address hierarchical structure knowledge unit 45 and an key character position in address knowledge 62 in the key character position in address knowledge unit 46. From all sets of the key character candidates extracted by the key-character candidate extraction unit 39, the candidates consistent with the address hierarchical structure knowledge 61 and the key character position in address knowledge 62 are extracted as key character sets (step S21).

When the number of key character set candidates is larger than 0 (step S22), it indicates a successful extraction.

On the other hand, if no key character sets are extracted (step S22), then the hierarchical level and the character type of an insufficient key character are predicted by referring to the address hierarchical structure knowledge 61 and the key character position in address knowledge 62 (step S23), and the obtained information is transmitted to the insufficient key character re-extraction unit 48.

Then, the insufficient key character re-extraction unit 48 refers to a pattern information table 63, and re-extracts, as a key character candidate, a semi-key character candidate which is entered in the pattern information table 63 and is a pattern containing the key character type of an insufficient hierarchical level in the first through the Nth recognition result (step S24).

Next, from all sets of key character candidates including semi-key character candidates re-extracted from the insufficient key character re-extraction unit 48, the sets consistent with the address hierarchical structure knowledge 61 and the key character position in address knowledge 62 are extracted as key character sets.

When the number of key character set candidates is larger than 0 (step S25), it indicates a successful re-extraction.

On the other hand, if no key character sets are extracted, an error code is output as an unsuccessful key character extraction. However, even if no key character sets are extracted, a character by character recognition result can be output by activating the single character recognition unit 55. Accordingly, an address can be prevented from not being read by a failure in key character extraction.

The address recognition apparatus according to the present invention is practically described below by referring to an actual handwritten character string.

Figure 11A:
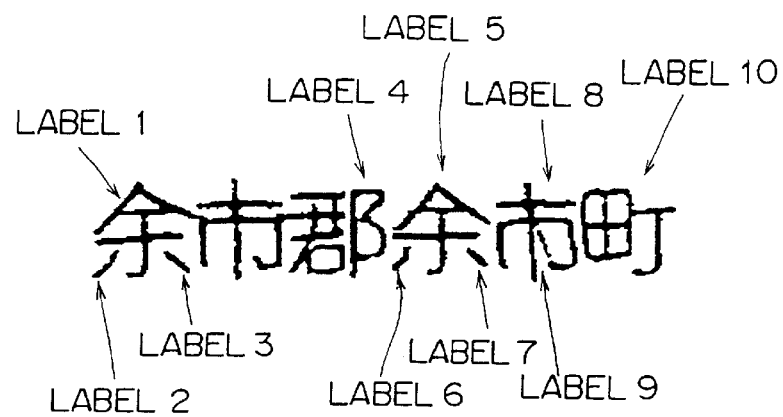
FIG. 11A shows a first example of a handwritten character string indicating an address which contains contact characters.

FIG. 11A shows the first example of a handwritten address character string containing contact characters.

In FIG. 11A, the address '余市郡余市町' is handwritten in the free-pitch column of a questionnaire post card, etc. The character string of the handwritten address is read by a scanner, etc. and a line is extracted from binarized image data. On this character string image, a labelling process is performed by the labelling unit 31 for each of the different connected elements.

As a result, a part of the first '余' and the left half of the first '市' and '郡' contact with each other. Therefore, these patterns are defined as one connected element and assigned a label 1. The remaining parts of the first '余' are assigned labels 2 and 3. The right half of the '郡' is assigned a label 4. Since the second '余' contains three separated patterns, it is assigned labels 5 through 7. Since the second '市' contains two separated patterns, it is assigned labels 8 and 9. The '町' is assigned a label 10. When the connected element assigned labels 1 through 10 is extracted, a rectangle enclosing each connected element is generated.

Figure 11B:
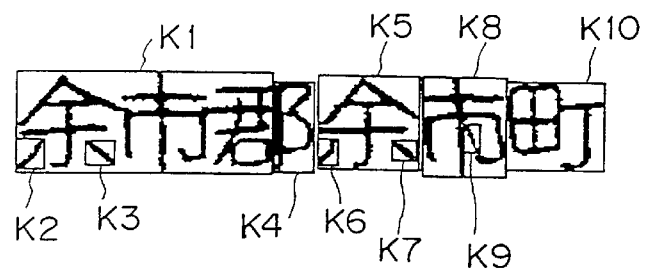
FIG. 11B shows a label image enclosed by a rectangle.

FIG. 11B shows a label image enclosed by an enclosing rectangle.

In FIG. 11B, corresponding to each of the connected elements assigned labels 1 through 10, rectangles K1 through K10 enclosing respective connected elements are generated. When the enclosing rectangles K11 through K10 are generated, the overlap level of the enclosing rectangles K1 through K10 are determined. When enclosing rectangles have high overlap levels to each other, they are integrated into each other.

Figure 11C:
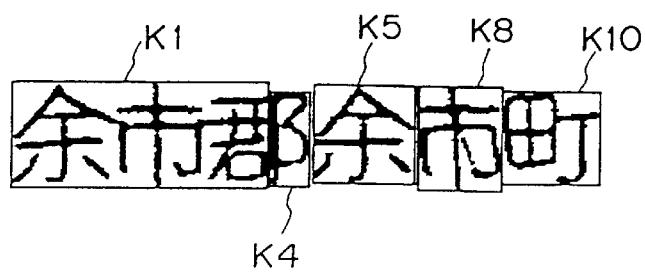
FIG. 11C shows a result of integrating enclosing rectangles.

FIG. 11C shows the result of integrating enclosing rectangles.

In FIG. 11C, since the enclosing rectangles K2 and K3 are included in the enclosing rectangle K1, the enclosing rectangles K2 and K3 are integrated into the enclosing rectangle K1. Similarly, since the enclosing rectangles K6 and K7 are included in the enclosing rectangle K5, the enclosing rectangles K6 and K7 are integrated into the enclosing rectangle K5.

Thus, even if different labels are assigned to the portions of one character because the components of the character is separated, by integrating enclosing rectangles having high overlap levels, the components are collectively processed as the components of the same character.

Next, the single-character area extraction unit 32 obtains a single character area based on the positions of the enclosing rectangles K1, K4, K5, K8, and K10 obtained by the integration. When a single character area is obtained, the average character size computation unit 33 computes an average character width We and an average character height Wh by, for example, excluding a considerable large or small enclosing rectangle from the single character area. For example, the average character size computation unit 33 computes the average character width We and the average character height Wh by excluding the enclosing rectangles K1 and K4 and using only the enclosing rectangles K5, K8, and K10.

The contact character determination/separation unit 34 determines for each of the patterns in the enclosing rectangles K1, K4, K5, K8, K10 whether or not they contain contact characters, and separates the patterns containing contact characters. That is, the width W and the height H of each of the enclosing rectangles K1, K4, K5, K8, and K10. Assume that the thresholds of the width/height, the width for a horizontal writing, and the height for a vertical writing are Rth, Wth, and Hth respectively. If an enclosing rectangle satisfying the following expressions exists, the pattern in the enclosing rectangle is regarded as containing contact characters.

W>Wth, and W/H>Rth (horizontal writing)

H>Hth, and W/H<Rth (vertical writing)

In the example shown in FIG. 11C, it is assumed that, in the enclosing rectangles K1, K4, K5, K8, and K10, the enclosing rectangle K1 satisfies the above described conditions, and the pattern in the enclosing rectangle K1 contains contact characters.

Figure 12A:
FIG. 12A shows a result of extracting a character string containing contact characters.

FIG. 12A shows an extraction result of a contact character string.

In FIG. 12A, the pattern in the enclosing rectangle K1 is shown as a candidate for contact characters. When a candidate for contact characters is extracted, the number of contact characters is computed based on We/2 for a horizontal writing and He/2 for a vertical writing. That is, the number of contact characters can be 1.5, 2.0, 2.5, etc. with an error rounded in 0.5 units. As a result, the number of contact characters shown in FIG. 12A is 2.5.

Thus, by computing the number of contact characters in 0.5 character units, contact characters can be efficiently separated even if only the right or left half of a horizontally written character, or only the upper or lower half of a vertically written character touches another character. When the number of contact characters is computed, the position of a provisional separation point candidate in the histogram of the number of black picture elements is obtained.

Figure 12C:
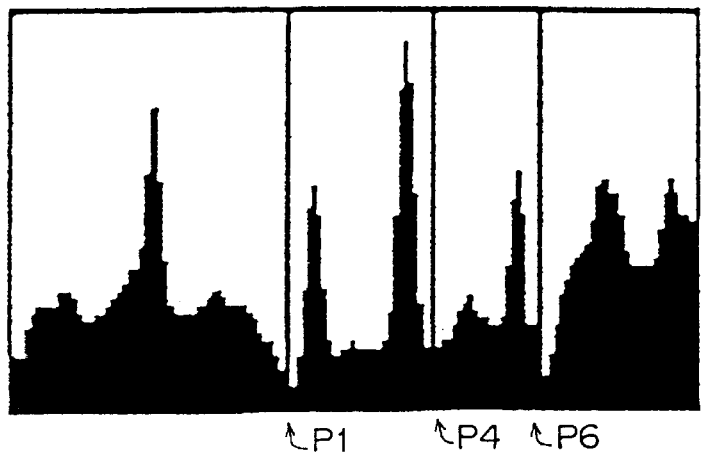
FIG. 12C shows the position of a provisional separation point in the histogram of the number of black picture elements of a character string containing contact characters.
Figure 12B:
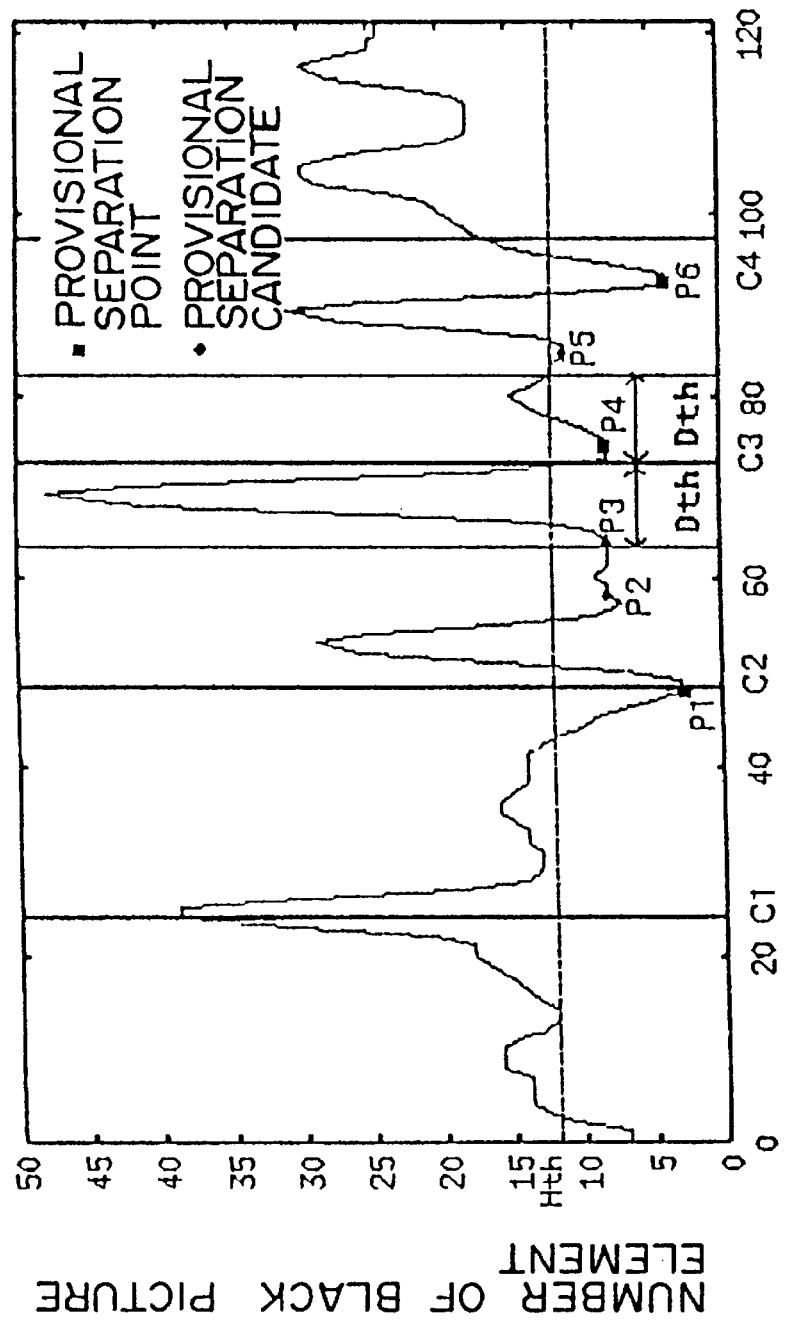
FIG. 12B shows the position of a separation point candidate in the histogram of the number of black picture elements of a character string containing contact characters.

FIG. 12B shows the position of a provisional separation point candidate in the histogram of the number of black picture elements of contact character strings.

In FIG. 12B, the histogram generation unit 35 obtains the histogram of the number of black picture elements by vertically scanning the patterns shown in FIG. 12A, and smooths it with a moving average, etc.

The provisional separation point candidate extraction unit 36 obtains all points, in the minimum points of the histogram of the number of black picture elements, having values smaller than the threshold Hth of the histogram of the number of black picture elements, and defines the points as provisional separation point candidates. In the example shown in FIG. 12B, the threshold of the histogram of the number of black picture elements Hth is set to 13 (Hth=13), and the points P1 through P6 are obtained as provisional separation point candidates. The threshold Hth of the histogram of the number of black picture elements can be set based on the resolution of an input image. The threshold Hth of the histogram of the number of black picture elements can be set to a large value for a high resolution image.

The provisional separation point candidate determination unit 37 obtains a point Ci (i 1, 2, . . . ) obtained by dividing the character width W for a horizontal writing, or the character height H for a vertical writing, into 0.5 character units along the vertical axis of the histogram of the number of black picture elements. In the example shown in FIG. 12B, since the number of contact characters is computed as 2.5, four division points C1 through C4 are obtained.

Then, a provisional separation point is determined such that at least one provisional separation point can be set from provisional separation point candidates in the range of the distance Dth along the horizontal axis of the histogram of the number of black picture elements. That is, when the number of provisional separation point candidates in the range of the distance Dth from the division point Ci is only one, the point is defined as a provisional separation point. When there are a plurality of provisional separation point candidates in the range of the distance Dth from the division point Ci, the point having the smallest value of the histogram of the number of black picture elements is defined as a provisional separation point. That is, assuming that there are $m(m>1)$ provisional separation point candidates in the range of the distance Dth from the division point Ci, and that the value of the histogram of the number of black picture elements at each point is $h_k$ ($k=1, \ldots, m$), the provisional separation point candidate Pk satisfying the following expression is a provisional separation point.

$$\min(h_k)(k=1, \ldots, m)$$

However, when there are also a plurality of provisional separation point candidates Pk satisfying the conditions, the point having the smallest value of the distance Dth in the horizontal axis is defined as a provisional separation point.

In the example shown in FIG. 12B, the provisional separation point candidate P1 exists in the range of the distance Dth from the division point C2. In the provisional separation point candidates P1 through P6, only the provisional separation point candidate P1 is in the range of the distance Dth from the division point C2. Therefore, the provisional separation point candidate P1 is defined as a provisional separation point.

Since the provisional separation point candidate P2 does not exist in any range of the distance Dth from the division point C1, C2, C3, and C4, it is not defined as a provisional separation point.

The provisional separation point candidates P3 and P4 exist in the range of the distance Dth from the division point C3, and there are a plurality of provisional separation point candidates within the range of the distance Dth from the division point C3. Therefore, the values $h_k$ of the histogram of the number of black picture elements of the provisional separation point candidates P3 and P4 are checked, and the point having a smaller value $h_k$ of the histogram of the number of black picture elements is defined as a provisional separation point. However, the values $h_k$ of the histogram of the number of black picture elements for the provisional separation point candidates P3 and P4 are the same. Therefore, the distances Dth from the division point C3 are checked for the provisional separation point candidates P3 and P4, and the candidate indicating a shorter distance Dth from the division point C3 is defined as a provisional separation point. As a result, since the distance Dth of the provisional separation point candidate P4 from the division point C3 is shorter than that of the provisional separation point candidate P3, the provisional separation point candidate P4 is defined as a provisional separation point.

Since the provisional separation point candidate P5 does not exist in any range of the distance Dth from the division point C1, C2, C3, and C4, it is not defined as a provisional separation point.

The provisional separation point candidate P6 exists in the range of the distance Dth from the division point C4. In the provisional separation point candidates P1 through P6, only the provisional separation point candidate P6 is in the range of the distance Dth from the division point C4. Therefore, the provisional separation point candidate P6 is defined as a provisional separation point.

FIG. 12C shows the position of the provisional separation point in the histogram of the number of black picture elements of a contact character string, In FIG. 12C, when the provisional separation points P1, P4, and P6 are determined, the pattern shown in FIG. 11A is provisionally separated.

Thus, even if a pattern is separated at a wrong point, a character is divided into two portions at worst by determining the provisional separation portions in 0.5 character units, thereby reducing wrong separation, and furthermore recovering from wrong separation by considering the integration of an enclosing rectangle into an adjacent rectangle.

Figure 13A:
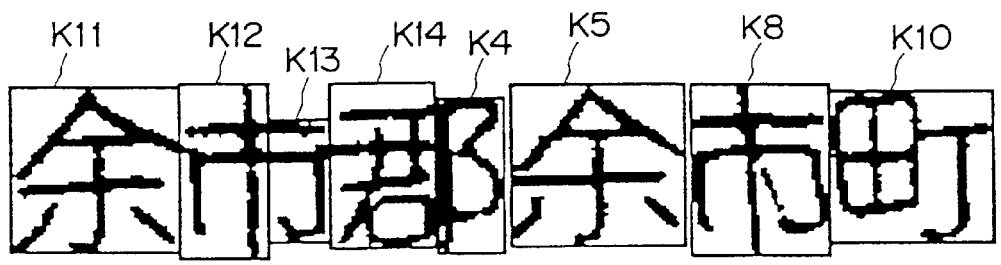
FIG. 13A shows a provisional separation result on the character string shown in FIG. 11A.

FIG. 13A shows a provisional separation result about the character string shown in FIG. 12A.

In FIG. 13A, when the pattern shown in FIG. 12A is separated at the provisional separation points P1, P4, and P6 in FIG. 12C, each pattern obtained by the separation is enclosed by the enclosing rectangles K11 through K14.

Figure 13B:
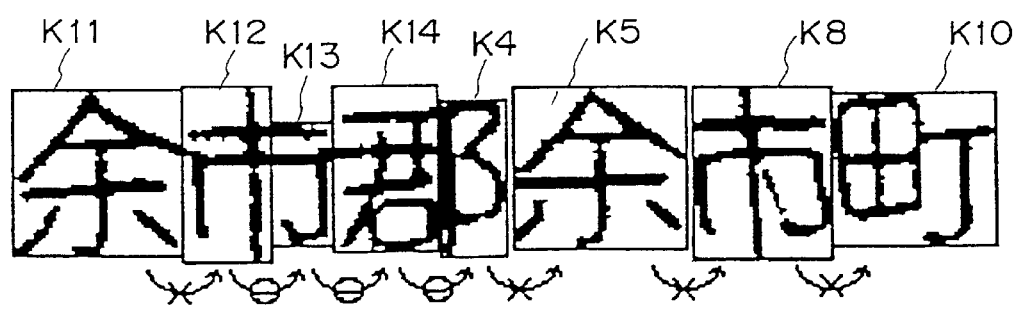
FIG. 13B shows a determination result whether or not a single pattern obtained by the provisional separation can be integrated into another pattern.

FIG. 13B shows the result of determining whether or not a single pattern obtained by provisional separation can be integrated.

In FIG. 13B, the pattern integration determination/integration unit 40 determines whether or not the pattern of the provisionally separated character string can be integrated sequentially into the pattern in the adjacent enclosing rectangles K11 through K14, K4, K5, K8, and K10. If it is determined that the integration of enclosing rectangles can be performed, then a provisional integration pattern is generated. In the integration determination, a target pattern is assumed to be integrated into an adjacent pattern (right adjacent pattern when characters are horizontally written, and lower adjacent pattern when characters are vertically written), and it is checked whether or not the following conditions are satisfied.

WI<WIth, WI/HI<RIth (when characters are horizontally written)

WI<WIth, WI/HI>RIth (when characters are vertically written)

When the condition described above are satisfied, it is determined that the pattern can be integrated.

In the expressions above, HI indicates the height of a pattern after the integration, WI indicates the width of the pattern after the integration, RIth indicates the threshold of the ratio of the width to the height, WIth indicates the threshold of the width when characters are horizontally written; and HIth indicates the threshold of the height when characters are vertically written.

When the enclosing rectangle K11 and the enclosing rectangle K12 are integrated, the ratio of the width to height of the integrated pattern becomes larger than the threshold RIth in the example shown in FIG. 13B. Therefore, it is determined that the pattern in the enclosing rectangle K11 cannot be integrated into the pattern in the enclosing rectangle K12. It is also determined that the pattern in the enclosing rectangle K12 cannot be integrated into the pattern in the enclosing rectangle K13 because, if they are integrated, the ratio of the width to the height of the pattern is lower than the threshold RIth, and the width of the pattern is smaller than the threshold WIth.

Similarly, it is determined that the pattern in the enclosing rectangle K13 cannot be integrated into the pattern in the enclosing rectangle K14, it is determined that the pattern in the enclosing rectangle K14 cannot be integrated into the pattern in the enclosing rectangle K4, it is determined that the pattern in the enclosing rectangle K4 cannot be integrated into the pattern in the enclosing rectangle K5, it is determined that the pattern in the enclosing rectangle K5 cannot be integrated into the pattern in the enclosing rectangle K8, and it is determined that the pattern in the enclosing rectangle K8 cannot be integrated into the pattern in the enclosing rectangle K10.

When it is determined that patterns can be integrated, the key-character candidate extraction unit 39 outputs as a recognition result the first through Nth order character types by extracting the feature and referring to the dictionary for each of single patterns and provisionally integrated patterns. When it is determined that patterns cannot be integrated, the key-character candidate extraction unit 39 outputs as a recognition result the first through Nth highest order character types by extracting the feature and referring to the dictionary only for single patterns.

FIG. 14A shows a recognition result of a single pattern obtained by provisional separation. In the example shown in FIG. 14, the first through the tenth character types are output as a recognition result.

FIG. 14A shows a recognition result obtained when a pattern in the enclosing rectangle K12 shown in FIG. 13B is processed as a single pattern. In this single pattern recognition result, '付', '竹', '甘', '对', '行', '所', '氏', '科', '杵', and '同' are presented as the first through the tenth character candidates.

Furthermore, as the distance between the single pattern in the enclosing rectangle K12 and each character type candidate, 506, 518, 536, 538, 551, 554, 559, 561, 572, and 574 are computed.

FIG. 14B shows the recognition result of a provisionally integrated single pattern obtained from provisional separation.

In FIG. 14B, a provisional integrated pattern is generated as a result of integrating the pattern in the enclosing rectangle K13 into the pattern in the enclosing rectangle K12. In this recognition result of the provisional integrated pattern in the enclosing rectangle K15, '竹', '布"', '府', '弟', '巾', '右', ' ', '防', '古' and '街' are presented as the first through tenth character type candidates. Additionally, 253, 351, 398, 406, 413, 432, 435, 436, 336, and 451 are computed as the values of distances between the provisional integration pattern in the enclosing rectangle K15 and the candidates for respective character types.

In the first through tenth character type candidates for the integration pattern in the enclosing rectangle K15, the key character '巿' is presented as the first order character type. When a key character exists in the first through tenth character type candidates, the key character level is computed to obtain a key character candidate and a semi-key character candidate.

The key character level can be defined as follows with di indicating the distance when a key character occurs as, for example, the ith target pattern.

$$\text{key character level}=1/\{1+\text{dix}[1+(i-1)\times wi]/\text{dth}\}(i=1, 2, \ldots, N)$$

where wi is a positive value smaller than 1, and indicates the weight of a candidate order. The weight wi is defined such that the key character level is set to 0 when the distance di is infinity, that the key character level is set to 1 when the distance di is 0, and that the key character level is set to 0.5 when the distance di is dth. A pattern having the key character level equal to or larger than 0.5 is defined as a key character candidate. A pattern having the key character level smaller than 0.5 and is not equal to 0 is defined as a semi-key character candidate. A pattern having the key character level equal to 0 is defined as a key character candidate larger than 0.5 is defined as a non-key character type.

In the example shown in FIG. 14A, since the character level of the single pattern is 0 with wi=0.2 and dth=480, the pattern is assumed to be a non-key character type. On the other hand, since the key character level of the provisional integration pattern is 0.65, the character type '巿' is assumed to be a key character candidate.

Thus, the information such as the determination as to whether or not each pattern can be integrated into its adjacent pattern, a key character level, a character type, a hierarchical level, etc. if a key character is determined is stored in the pattern information table.

FIG. 15 shows an example of the pattern information table generated for the character string shown in FIG. 11A.

In FIG. 15, a pattern information table contains columns for entries of flag information, hierarchical level information, a character type, a character level, a pertaining line, a serial number in line, etc. for each of the single pattern in the enclosing rectangles K11 through K14, K4, K5, K8, and K10 shown in FIG. 13B, and each of the provisional integrated patterns of the single pattern in the enclosing rectangles K11 through K14, K4, K5, K8, and K10 integrated into the right adjacent single pattern. A flag 1 indicates a key character candidate. A flag 2 indicates a semi-key character candidate. A flag 0 indicates other character types. In the example shown in FIG. 15, the key character level is expressed by percentage. The hierarchical level information column contains a hierarchical level of a key character used to express an address.

Figure 16:
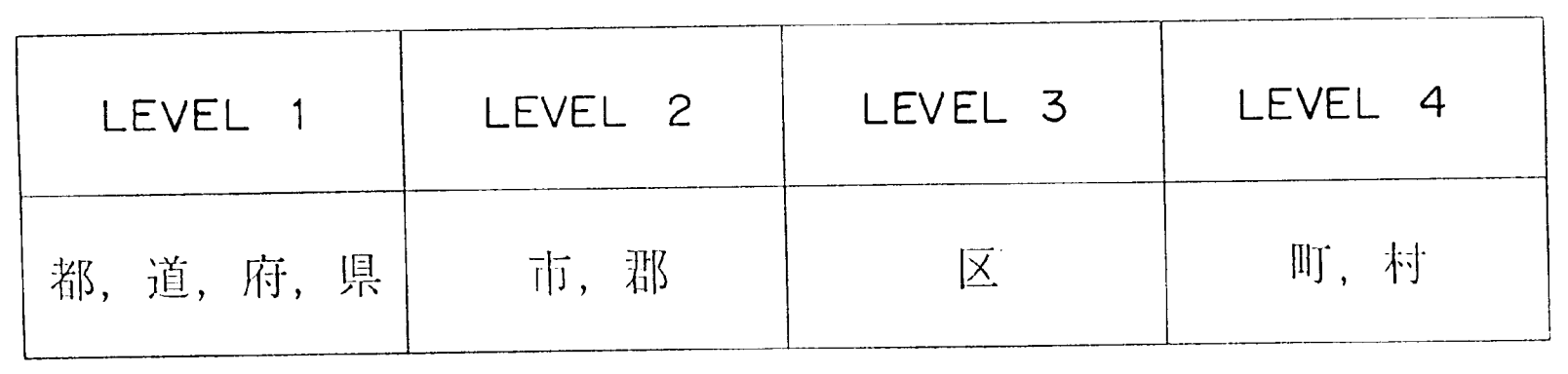

FIG. 16 shows a table containing a hierarchical level of a key character used in expressing an address.

In FIG. 16, the hierarchical level of the key characters '都', '道', '府', and '県' is 1, the hierarchical level of the key characters '市' and '郡' is 2, the hierarchical level of the key character '区' is 3, and the hierarchical level of the key characters '町' and '村' is 4.

In the pattern information table shown in FIG. 15, it is determined by the pattern integration determination/integration unit 40 that the provisional integrated patterns in the enclosing rectangles K11, K4, K5, K8, and K10 cannot be integrated. Therefore, the columns are blank.

The single patterns in the enclosing rectangles K12, K14, and K5, and the single pattern and the provisional integrated pattern in the enclosing rectangle K13 have flags of 0 indicating that the patterns refer to character types other than key characters, and that the key character level is 0.0%.

The single pattern in the enclosing rectangle K11 has a flag of 2 indicating that the pattern refers to a semi-key character candidate. The character '村' is indicated as a character type of the semi-key character candidate. The hierarchical character level of the character '村' is 4, and the key character level is 25.4%.

The provisional integrated pattern in the enclosing rectangle K11 has a flag of 1 indicating that the pattern refers to a key character candidate. The character '市' is indicated as a character type of the key character candidate. The hierarchical character level of the character '市' is 2, and the key character level is 65.5%.

The provisional integrated pattern in the enclosing rectangle K14 has a flag of 1 indicating that the pattern refers to a key character candidate. The character '郡' is indicated as a character type of the key character candidate. The hierarchical character level of the character '郡' is 2, and the key character level is 63.4%.

The single pattern in the enclosing rectangle K4 has a flag of 2 indicating that the pattern refers to a semi-key character candidate. The character '区' is indicated as a character type of the semi-key character candidate. The hierarchical character level of the character '区' is 3, and the key character level is 45.8%.

The single pattern in the enclosing rectangle K8 has a flag of 1 indicating that the pattern refers to a key character candidate. The character '市' is indicated as a character type of the key character candidate. The hierarchical character level of the character '市' is 2, and the key character level is 60.0%.

The single pattern in the enclosing rectangle K10 has a flag of 1 indicating that the pattern refers to a key character candidate. The character '町' is indicated as a character type of the key character candidate. The hierarchical character level of the character '町' is 4, and the key character level is 67.9%.

When the pattern information table shown in FIG. 15 is generated, the single pattern and the provisional integrated pattern whose flag is set to 1 are extracted as key character candidates. Then, the combinations for key character candidates shown in the pattern information table are considered, and it is determined whether or not these combinations contain consistent address hierarchical structure knowledge and key character position in address knowledge.

Figure 17:
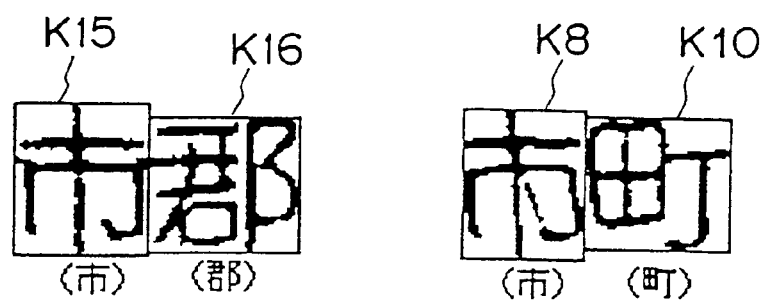
FIG. 17 shows the key character candidate extracted from the character string shown in FIG. 11A.

FIG. 17 shows the key character candidate extracted from the character string shown in FIG. 11A.

In FIG. 17, the provisional integrated pattern obtained by integrating the pattern in the enclosing rectangle K12 shown in FIG. 13B into the pattern in the enclosing rectangle K13 is extracted as a key character candidate, and enclosed by the enclosing rectangle K15. The pattern '市' enclosed by the enclosing rectangle K15 is provisionally separated into halves by the separation part determination/separation unit 34 shown in FIG. 7, and then integrated into one by the integrating and recognizing process by the key-character candidate extraction unit 39. Thus, it is determined that the pattern is '市'.

Thus, even if a key character is separated into two partial patterns when a connected pattern is separated, adjacent patterns can be integrated in performing a recognizing process, thereby correctly extracting a key character.

The provisional integrated pattern obtained by integrating the pattern in the enclosing rectangle K14 shown in FIG. 13B into the pattern in the enclosing rectangle K4 is extracted as a key character candidate, and enclosed by the enclosing rectangle K16. The pattern '郡' enclosed by the enclosing rectangle K15 is originally formed by two separate patterns. The left half and the right half of the pattern '郡' are extracted as separate patterns. As shown in FIG. 11A, the left half of the pattern '郡' touches the character '市' which is adjacent to the pattern '郡'. As a result, as shown in FIG. 11C, the left half of the pattern '郡' is assumed to be a pattern in the enclosing rectangle K1 while the right half of the pattern '郡' is assumed to be a pattern in the enclosing rectangle K4.

The left half of the pattern '郡' is separated from the pattern in the enclosing rectangle K1 by the separation part determination/separation unit 34 shown in FIG. 7. The left half of the pattern '郡' segmented by the separation is integrated into the pattern K4 in the integrating and recognizing process by the key-character candidate extraction unit 39, and the pattern '郡' is extracted as a key character candidate.

The pattern in the enclosing rectangle K8 shown in FIG. 13A is extracted as a key character candidate '市', and the pattern in the enclosing rectangle K10 shown in FIG. 13A is extracted as a key character candidate '町'.

When the key character candidates are extracted, the key character candidate determination unit 47 extracts retrieves the address hierarchical structure knowledge and the key character position in address knowledge from the address hierarchical structure knowledge unit 45 and the key character position in address knowledge unit 46 respectively, and checks whether or not there are combinations of key character candidates consistent with the address hierarchical structure knowledge and the key character position in address knowledge.

FIG. 18A shows the hierarchical structure of the key character used in expressing an address.

In FIG. 18A, the address hierarchical structure depends on {都} or {道}, and {府} or {県}. Relating to 都, the key character that can follow {道} are {区}, {区}, {町}, {市}, {市}, {町}, {郡}, {町}, {郡}, {村}, {町}, and {村}. Relating to {道}, {府}, and {県}, the key character which can follow {道}, {府}, or {県} are {市}, {市, 区}, {市, 区, 町}, {市, 町}, {郡, 町}, and {郡}, 村}.

The key character position in address knowledge is the knowledge about the position of the occurrence of the key character such as 'A key character does not occur at the head of a line', 'A key character does not occur after another key character', etc.

By referring to the address hierarchical structure knowledge and key character position in address knowledge, the key character candidates not satisfying these rules can be removed as a result of mis-recognition of a key character type in a place-name or mis-segmentation of a pattern. When there is an uncertain key character in a place-name which cannot be determined by character, a set of a plurality of key characters are defined as key character set candidate, and then the place-name word collective recognition unit 51 can determine a correct set of key characters.

FIG. 18B shows a key character set which can be used for a key character candidate shown in FIG. 17.

In FIG. 18B, the following three combinations of the key character candidates shown in FIG. 17 are consistent with the address hierarchical structure knowledge and the key character position in address knowledge.

| | |
|---|---|
| first set [市, 町] | 0市000町 |
| second set [郡, 町] | 00郡00町 |
| third set [市] | 0000市0 |

When there are key character sets consistent with the address hierarchical structure knowledge and the key character position in address knowledge, the provisional separation position and the provisional integration result of a pattern corresponding to the key character set candidate are determined as a separation position and a result of integration.

When the key character set candidate is determined, the information about each key character group candidate is transmitted to the place-name word segmentation unit 49. The place-name word segmentation unit 49 segments a place-name word candidate for each key character set candidate according to the key character position information.

For example, when {市, 町} shown in FIG. 18B is used as a key character set candidate, a pattern before {市} and a pattern between {市} and {町} are extracted as place-name words from the pattern shown in FIG. 13. As a result, patterns respectively corresponding to '余' and '郡余市' are extracted as place-name words.

When {郡, 町} shown in FIG. 18B is used as a key character set candidate, a pattern before {郡} and a pattern between {郡} and {町} are extracted as place-name words from the pattern shown in FIG. 13. As a result, patterns respectively corresponding to the first '余市' and the second '余市' are extracted as place-name words.

When {市} shown in FIG. 18B is used as a key character set candidate, a pattern before {市} and a pattern after {市} are extracted as place-name words from the pattern shown in FIG. 13. As a result, patterns respectively corresponding to '余市郡余' and '町' are extracted as place-name words.

The feature extraction unit 52 extracts an image feature for the place-name word pattern segmented by the place-name word segmentation unit 49.

For example, when {市, 町} shown in FIG. 18B is used as a key character set candidate, the feature vectors of respective patterns corresponding to '余' and '郡余市' extracted as place-names are extracted. When the feature vector of the pattern '郡余市' is extracted, the pattern '郡余市' is collectively processed without processing '郡余市' as separated in character units to individually extract '郡', '余', and '市'. Thus, the feature vector of the entire character string '郡余市' is extracted.

When {郡, 町} shown in FIG. 18B is used as a key character set candidate, the feature vectors of the patterns corresponding respectively to the first '余市' and the second '余市' extracted as place-names are extracted. When the feature vector of the pattern '余市' is extracted, the pattern '余市' is collectively processed without processing '余市' as separated in character units to individually extract '余' and '市'. Thus, the feature vector of the entire character string '余市' is extracted.

When '市' shown in FIG. 18B is used as a key character set candidate, the feature vectors of respective patterns corresponding to '余市郡余' and '町' extracted as place-names are extracted. When the feature vector of the pattern is extracted, the pattern '余市郡余' is collectively processed without processing '余市郡余' as separated in character units to individually extract '余', '市', '郡', and '余'. Thus, the feature vector of the entire character string '郡余市' is extracted.

The place-name word dictionary unit 50 can enter the feature vectors of the patterns indicating all place-names in Japan. For example, the attribute of a place-name is '県' the feature vectors of the patterns indicating the place-names such as '千葉', '神奈川', '埼玉', etc. are entered corresponding to the attribute '県'. If the attribute of a place-name is '区', then the feature vectors of patterns indicating '世田谷', '千代田', '中央', etc. are entered corresponding to the attribute '区'.

For example, when a pattern immediately before the key character '県' is recognized, it is compared only with the patterns indicating place-names corresponding to the attribute of '県'.

Thus, the frequency of comparison can be reduced when a place-name is recognized, thereby quickly performing the entire process.

The dictionary reference unit 53 checks the attribute of the place-name immediately before the key character based on the key character. Then, in the feature vectors of the place-names entered in the place-name word dictionary unit 50, the feature vectors of place-name word patterns corresponding to the attributes of place-names are compared with the feature vectors of the place-name word patterns extracted by the feature extraction unit 52.

For example, when {市, 町} shown in FIG. 18B is used as a key character set candidate, each feature vector of {余} and {郡余市} extracted as place-name words are compared with the feature vectors of place-names entered in the place-name word dictionary unit 50. Since the attribute of the '余' extracted as a place-name word is {市}, it is compared with the feature vector of the place-names having the attribute of {市} in the feature vectors of place-names entered in the place-name word dictionary unit 50. Since the attribute of the '郡余市' extracted as a place-name word is '町', it is compared with the feature vector of the place-name having the attribute of '町' in the feature vectors of the place-names entered in the place-name word dictionary unit 50.

Assuming that {町} named '余' and {町} named '郡余市' do not exist in the Japanese place-names, the recognition result of the place-name word pattern '余' or the place-name word pattern '郡余市' is not output or the recognition rate is considerably low. Therefore, {市, 町} can be removed from the key character set candidate.

When {郡, 町} shown in FIG. 18B is used as a key character set candidate, each feature vector of the first {余市} and the second {余市} extracted as place-name words are compared with the feature vectors of place-names having the attribute of {郡} entered in the place-name word dictionary unit 50. Since the attribute of the {余市} extracted as a place-name word is {市}, it is compared with the feature vector of the place-names having the attribute of {市} in the feature vectors of place-names entered in the place-name word dictionary unit 50. Since the attribute of the second '余市' extracted as a place-name word is '町', it is compared with the feature vector of the place-name having the attribute of '町' in the feature vectors of the place-names entered in the place-name word dictionary unit 50.

Assuming that {郡} named '余市' and {町} named '余市' exist in the Japanese place-names, the place-name entered in the place-name word dictionary unit 50 is output as a place-name candidate as the recognition result of the place-name word pattern '余市'. When a plurality of place-name candidates are output for one place-name word pattern, a correct place-name candidate can be selected by referring to the place-name knowledge in the place name information unit 59.

When {市} shown in FIG. 18B is used as a key character set candidate, each feature vector of '余市郡余' and '町' extracted as place-name word is compared with the feature vector of the place-name entered in the place-name word dictionary unit 50. Since the attribute of '余市郡余' extracted as a place-name is '市', it is compared with the feature vector of the place-name having the attribute of {市} in the feature vectors of the place-names entered in the place-name word dictionary unit 50.

Assuming that {市} named '余市郡余' and a place-name {町} do not exist in the Japanese place-names, the recognition result of the place-name word pattern '余市郡余' or the place-name word pattern '町' is not output or the recognition rate is considerably low. Therefore, {市} can be removed from the key character set candidate.

The place name information unit 59 stores the knowledge about the connection between place-names. For example, the knowledge as to whether or not there is a place-name having '余市町' after the place-name '余市郡', and the knowledge about the name of {区} that can follow after the place-name '横浜市'.

The address determination unit 60 retrieves the place-name knowledge from the place name information unit 59, and outputs a candidate consistent with the place-name knowledge as an address read result from among the place-name candidates output from the address collective recognition unit 51.

For example, when it is determined that {町} named '余市' comes after {甘} named '余市', which is consistent with the place-name knowledge, '余市郡余市町' is output as a result of reading an address.

When a set of place-names consistent with the place-name knowledge do not exist, no address read results are output, but an error code is output.

Figure 19:
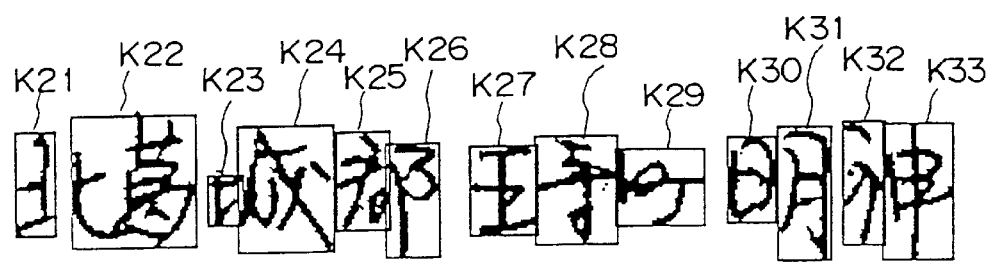
FIG. 19 shows the second example of a handwritten character string indicating an address containing contact characters.

FIG. 19 shows the second example of a handwritten address character string containing contact characters.

In FIG. 19, the address is '北葛城郡王寺町明神' is handwritten in the free-pitch column of a questionnaire post card etc. The character string of the handwritten address is read by a scanner, etc. and a line is extracted from binarized image data. On this character string image, a labelling process is performed by the labelling unit 31 for each of the different combination elements.

Then, an enclosing rectangle is generated for each connected elements. By integrating enclosing rectangles having large overlap levels, enclosing rectangles K21 through K33 are generated. When the enclosing rectangles K21 through K33 are generated, it is determined whether or not there are patterns to be separated. If it is determined that there are no patterns to be separated, then it is further determined whether or not patterns can be sequentially integrated from the leading pattern into adjacent patterns in the enclosing rectangles. When it is determined that a pattern can be integrated, the pattern is integrated to generate a provisional integrated pattern.

Then, a recognizing process is performed on a single pattern in the enclosing rectangles K21 through K33 and a provisional integrated pattern for which it is determined that it actually can be integrated. Based on the recognizing result, a key character level is computed.

When the information as to whether or not each pattern can be integrated into adjacent patterns, about a key character level, the character type, hierarchical level when it is a key character, etc. is obtained, the information is stored in the pattern information table.

FIG. 20 shows an example of the pattern information table generated for the character string shown in FIG. 19.

In FIG. 20, a pattern information table 100 contains columns for entries of flag information, hierarchical level information, a character type, a character level, a pertaining line, a serial number in line, etc. for each of the single pattern in the enclosing rectangles K21 through K33 shown in FIG. 19, and each of the provisional integrated patterns of the single pattern in the enclosing rectangles K1 through K14, K4, K5, K8, and K10 integrated into the right adjacent single pattern. A flag 1 indicates a key character candidate. A flag 2 indicates a semi-key character candidate. A flag 0 indicates other character types. The key character level is expressed by percentage. The hierarchical level information column contains a hierarchical level of a key character used to express an address.

It is determined by the pattern integration determination/integration unit 40 that the provisional integrated patterns in the enclosing rectangles K24, K26 through K29 cannot be integrated. Therefore, the columns are blank.

The single patterns and the provisional integrated patterns in the enclosing rectangles K21 through K23, and K30 through K33, and the single patterns in the enclosing rectangles K24, K25, and K28 have flags of 0 indicating that the patterns refer to character types other than key characters, and that the key character level is 0.0%.

The provisional integrated pattern in the enclosing rectangle K25 has a flag of 1 indicating that the pattern refers to a key character candidate. The character '郡' is indicated as a character type of the key character candidate. The hierarchical character level of the character '郡' is 2, and the key character level is 67.6%.

The single pattern in the enclosing rectangle K26 has a flag of 2 indicating that the pattern refers to a semi-key character candidate. The character '市' is indicated as a character type of the semi-key character candidate. The hierarchical character level of the character '市' is 2, and the key character level is 21.8%.

The single pattern in the enclosing rectangle K27 has a flag of 2 indicating that the pattern refers to a semi-key character candidate. The character '区' is indicated as a character type of the semi-key character candidate. The hierarchical character level of the character '区' is 3, and the key character level is 29.6%.

The single pattern in the enclosing rectangle K29 has a flag of 2 indicating that the pattern refers to a semi-key character candidate. The character '町' is indicated as a character type of the semi-key character candidate. The hierarchical character level of the character '町' is 4, and the key character level is 47.9%.

When the pattern information table is generated, the single pattern and the provisional integrated pattern whose flag is set to 1 are extracted as key character candidates. Then, the combinations for key character candidates shown in the pattern information table are considered, and it is determined whether or not these combinations contain consistent address hierarchical structure knowledge and key character position in address knowledge.

FIG. 21A shows the key character candidate extracted from the character string shown in FIG. 19. In FIG. 21A, the provisional integrated pattern obtained by integrating the pattern in the enclosing rectangle K25 shown in FIG. 19 into the pattern in the enclosing rectangle K26 is extracted as a key character candidate, and enclosed by the enclosing rectangle K34. The pattern '郡' enclosed by the enclosing rectangle K34 is originally formed by two separated patterns, extracted as two separate partial patterns, and then integrated into one by the integrating and recognizing process by the key-character candidate extraction unit 39. Thus, it is determined that the pattern is '郡'.

When a key character '郡' is extracted, the address hierarchical structure knowledge and the key character position in address knowledge are referred to. However, '郡' is not singly used as a key character, but necessarily followed by the key character '町' or '村'.

Therefore, when the key character candidate determination unit 47 cannot extract any key character set candidate due to insufficient key characters, it requests the insufficient key character re-extraction unit 48 to re-extract the required key character, and transmits the information about the key character to be re-extracted.

For example, when the key character candidate determination unit 47 can extract only the key character candidate for '郡', it notifies the insufficient key character re-extraction unit 48 that '郡' is followed by '町' or '村'. Then, the key character candidate determination unit 47 requests the insufficient key character re-extraction unit 48 to re-extract the key character of '町' or '村'.

Upon request to re-extract the key character, the insufficient key character re-extraction unit 48 refers to the pattern information table, and re-extracts the requested key character from the semi-key character candidates. In this case, it refers to the address hierarchical structure knowledge to be consistent with the knowledge.

For example, the pattern information table shown in FIG. 20 contains a single pattern in the enclosing rectangle K26, a single pattern in the enclosing rectangle K27, and a single pattern in the enclosing rectangle K29 as a semi-key character candidate. However, the pattern matching '町' or '村' in character type is the single pattern in the enclosing rectangle K29. Therefore, the single pattern in the enclosing rectangle K29 is re-extracted as a key character candidate.

FIG. 21B shows a key character candidate re-extracted from the character string shown in FIG. 19.

In FIG. 21B, as a result of the re-extraction of a key character candidate, the pattern in the enclosing rectangle K34 shown in FIG. 19 is extracted as a key character candidate, and the pattern in the enclosing rectangle K29 shown in FIG. 19 is extracted as a key character candidate '町'.

When a key character candidate is extracted, a combination of key character candidates which is consistent with the address hierarchical structure knowledge and the key character position in address knowledge is selected.

FIG. 21C shows a key character set available in the character string shown in FIG. 19.

In FIG. 21C, in the combination of key character candidates shown in FIG. 19, a key character set candidate consistent with the address hierarchical structure knowledge and the key character position in address knowledge is only one.

first set {郡, 町}

When a key character set candidate consistent with the address hierarchical structure knowledge and the key character position in address knowledge is detected, the information about each key character group candidate is transmitted to the place-name word segmentation unit 49. The place-name word segmentation unit 49 segments a place-name word candidate for each key character set candidate according to the position information about the key character. For example, when {郡, 町} shown in FIG. 21C is used as a key character set candidate, a pattern before {郡}, a pattern between {郡} and {町}, and a pattern after {町} are extracted as place-name words. As a result, patterns respectively corresponding to the '北葛城', '王寺', and '明神' are extracted as place-name words.

When a pattern of '北葛城', a pattern of '王寺', and a pattern of '明神' are extracted as patterns of place-name words, each of the feature vectors of the patterns '北葛城', '王寺', and '明神' is extracted. When the feature vector of the pattern corresponding to '北葛城' is extracted, the pattern corresponding to '北葛城' is collectively processed without processing the pattern corresponding to '北葛城' as separated in character units to individually extract the feature vectors of the pattern corresponding to '北', the pattern corresponding to '葛', and the pattern corresponding to '城'. Thus, the feature vector of the entire character string '北葛城' is extracted.

When the feature vector of the pattern corresponding to '王寺' is extracted, the pattern corresponding to '王寺' is collectively processed without processing the pattern corresponding to '王寺' as separated in character units to individually extract the feature vectors of the pattern corresponding to '王', and the pattern corresponding to '寺'. Thus, the feature vector of the entire character string '王寺' is extracted.

When the feature vector of the pattern corresponding to '明神' is extracted, the pattern corresponding to '明神' is collectively processed without processing the pattern corresponding to '明神' as separated in character units to individually extract the feature vectors of the pattern corresponding to '明', and the pattern corresponding to '神'. Thus, the feature vector of the entire character string '明神' is extracted.

When the pattern of '北葛城' the pattern of '王寺', and the pattern of '明神' are extracted, each of the feature vectors of the pattern corresponding to '北葛城', the pattern corresponding to '王寺', and the pattern corresponding to '明神' is compared with the feature vector of a place-name entered in the place-name word dictionary unit 50. Since the attribute of the pattern corresponding to '北葛城' extracted as a place-name word is {郡}, it is compared with the feature vector of a place-name, having the attribute of '郡', entered in the place-name word dictionary unit 50. Since the attribute of the pattern corresponding to '王寺' extracted as a place-name word is '町', it is compared with the feature vector of a place-name, having the attribute of '町', entered in the place-name word dictionary unit 50.

Assuming that {郡} named '北葛城'. {町} named '王寺', and a place-name '明神' exist in the Japanese place-names, the place-name entered in the place-name word dictionary unit 50 is output as a place-name candidate as the recognition result of the place-name word patterns '北葛城', '王寺', and '明神'. When a plurality of place-name candidates are output for one place-name word pattern, a correct place-name candidate can be selected by referring to the place-name knowledge in the place name information unit 59.

If it is determined that named {郡} named '北葛城'. {町} named '王寺', and a place-name '明神' are consistent with the place-name knowledge, then character codes, etc. of '北葛城郡王寺町明神' are output as a result of reading an address.

Described below is the key character recognition dictionary according to an embodiment of the present invention.

In FIG. 7, the key-character candidate extraction unit 39 refers to the key-character recognition dictionary 38 to extract a key character candidate from the pattern of an original image, and recognizes the characters of each label pattern and integrated label pattern. When the character type entered in the key-character recognition dictionary 38 is not limited, there are 3000 characters of the JIS first level kanji character type, and about 1000 place-name kanji characters to be checked. Therefore, the frequency of comparisons becomes high, and a long processing time is required.

On the other hand, assume that the character type entered in the key-character recognition dictionary 38 is limited. For example, if only the key characters such as '都', '道', '府', '県', '市', '郡', '区', '町', '村' are entered, not only a key character, but also a pattern similar to the key character can be often extracted, thereby outputting an excess key character candidates.

FIG. 22 shows a result of recognizing a key character type when the key character recognition dictionary according to an embodiment of the present invention is utilized.

FIG. 22 actually shows the recognition result (candidate character type and distance up to the Nth order) obtained using the key-character recognition dictionary 38 in which all character types are entered, and the recognition result (candidate character type and distance up to the Nth order) obtained using the key-character recognition dictionary 38 in which only nine character types are enterd, that is '都', '道', '府', '県', '市', '郡', '区', '町', '村' for the sample pattern 61 of the character type of '見' and the sample pattern 62 of the character type of '県'.

As a recognition result of the sample pattern 61, when the key-character recognition dictionary 38 in which all character types are entered is used, '見' is output as a character type of the first candidate, '貝' is output as a character type of the second candidate, and '県' is output as a character type of the third candidate. Furthermore, 210, 250, and 320 are output as the distances between the sample pattern 62 and the respective character types. When the key-character recognition dictionary 38 in which only the key character types are entered is used, '県' is output as a character type of the first candidate, and '道' is output as a character type of the second candidate. 320 and 640 are output as the distances between the sample pattern 61 and the respective character types.

As a recognition result of the sample pattern 62, when the key-character recognition dictionary 38 in which all character types are entered is used, '県' is output as a character type of the first candidate, '見' is output as a character type of the second candidate, and '貝' is output as a character type of the third candidate. Furthermore, 320, 480, and 590 are output as the distances between the sample pattern 62 and the respective character types. When the key-character recognition dictionary 38 in which only the key character types are entered is used, '県' is output as a character type of the first candidate, and '道' is output as a character type of the second candidate. 320 and 640 are output as the distances between the sample pattern 62 and the respective character types.

When the key-character recognition dictionary 38 in which all character types are entered is used, the distance between the sample pattern 61 and the key character type '県' is 320, and is equal to the distance between the sample pattern 62 and the key character type '県'. Therefore, it is not possible to determine that the sample pattern 61, which is not a key character, is not a key character, and to determine that the sample pattern 62, which is a key character, is a key character only by evaluating the distance between the key character type '県'. However, the occurrence order of the key character type '県' is the third for the sample pattern 61, but the first for the sample pattern 62. As a result, it is possible to determine that the sample pattern 61, which is not a key character, is not a key character, and to determine that the sample pattern 62, which is a key character, is a key character by evaluating the occurrence order of the key character type '県'.

On the other hand, when the key-character recognition dictionary 38 in which only key character types are entered is used, the distance between the sample pattern 61 and the key character type '県' is 320, and is equal to the distance between the sample pattern 62 and the key character type '県'. Also, the occurrence order of the key character type '県' is the first for both sample patterns 61 and 62. Therefore, when the key-character recognition dictionary 38 in which only the key character types are entered is used, it is not possible to determine that the sample pattern 61, which is not a key character, is not a key character, and to determine that the sample pattern 62, which is a key character, is a key character even if the distance from the key character type '県' is evaluated or the occurrence order of the key character type '県' is evaluated.

In this example, if the character types in the key-character recognition dictionary 38 is excessively limited, it is predicted that key character candidates are extremely extracted. When key character candidates are extremely extracted, there is a strong possibility that an address is mistakenly read.

On the other hand, if there are too many character types in the key-character recognition dictionary 38, an impractically long processing time is required. Therefore, it is necessary to appropriately limit the character types in the key-character recognition dictionary 38.

Figure 23:
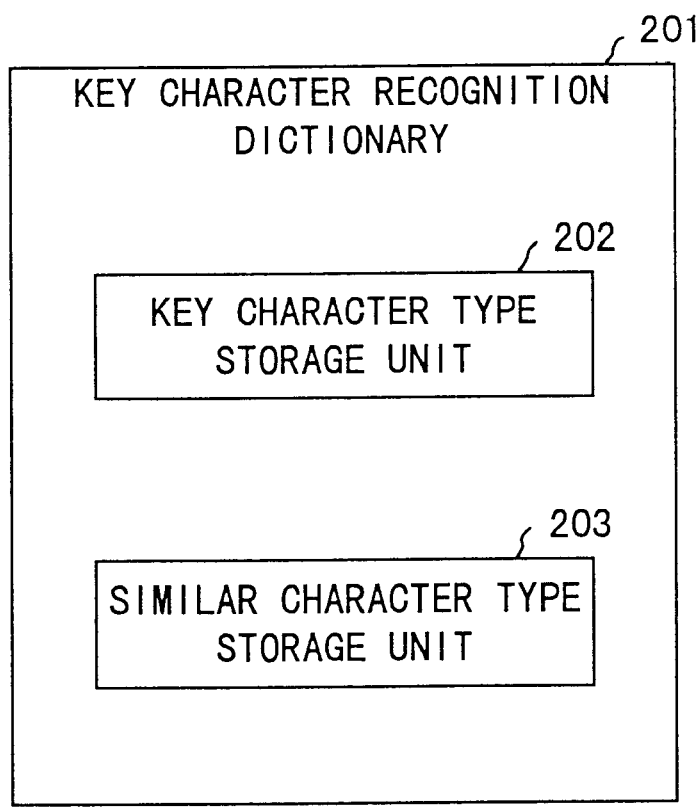
FIG. 23 is a block diagram showing the configuration of the key character recognition dictionary according to an embodiment of the present invention.

FIG. 23 is a block diagram showing the configuration of the key character recognition dictionary according to an embodiment of the present invention.

In FIG. 23, a key character recognition dictionary 201 comprises a key character type storage unit 202 and a similar character type storage unit 203, and the character types entered in the key character recognition dictionary 201 is limited to the key character types and the similar character types.

As a result, as compared with the case where all character types are entered in the key character recognition dictionary, the frequency of the comparing process between a pattern to be recognized and a character type entered in the key character recognition dictionary can be reduced, thereby shortening the processing time in recognizing an address. Furthermore, unlike the case where only key character types are entered in the key character recognition dictionary, it can be determined whether or not a pattern to be recognized is a key character in consideration of the occurrence order of the key character type for the pattern to be recognized. As a result, it can be determined with high precision whether or not a pattern, which cannot be normally determined to be a key character or not only by evaluating the distance between the pattern to be recognized and the key character type, is a key character.

FIG. 24 shows an example of a key character type entered in the key character recognition dictionary 201 and a similar character type.

In FIG. 24, similar character types for the key character type '都' can be, for example, '郡', '部', '祁', and '郎' entered in the key character recognition dictionary. Similar character types for the key character type '道' can be, for example, '追', '造', '迫', and '通' entered in the key character recognition dictionary. Similar character types for the key character type '県' can be, for example, '造', '迫', '通', and '碕' entered in the key character recognition dictionary. Similar character types for the key character type '県' can be, for example, '県', '具', '貝', and '見' entered in the key character recognition dictionary. Similar character types for the key character type '千代田' can be, for example, '布', '巾', '希', and '帝' entered in the key character recognition dictionary. Similar character types for the key character type '郡' can be, for example, '都', '邦', '部', and '郎' entered in the key character recognition dictionary. Similar character types for the key character type '区' can be, for example, '匹', '巨', '匠', and '医' entered in the key character recognition dictionary. Similar character types for the key character type '町' can be, for example, '野', '財', '時', and '肝' entered in the key character recognition dictionary. Similar character types for the key character type '村' can be, for example, '付', '対', '杜', and '打' entered in the key character recognition dictionary.

FIG. 25 shows the key character recognition result obtained when the key character recognition dictionary containing only the key character types and the similar character types as shown in FIG. 24.

In FIG. 25, '見' is output as the first character type candidate for the sample pattern 61 of '見' as a character type, '貝' is output as the second character type candidate, '県' is output as the third character type candidate. '県' is output as the first character type candidate for the sample pattern 62 of '見' as a character type, '見' is output as the second character type candidate, '貝' is output as the third character type candidate.

The distance between the feature vector of the sample pattern 61 and the feature vector of '県' is equal to the distance between the feature vector of the sample pattern 62 and the feature vector of '県' Therefore, it cannot be determined based on the distance only that the sample pattern 61 is not a key character. However, the occurrence order of the key character type '県' is the first for the sample pattern 62 while the occurrence order of the key character type '県' is the third for the sample pattern 62. Therefore, the sample pattern 62 can be extracted as a key character candidate while the sample pattern 61 can be suppressed and not extracted as a key character candidate by, for example, extracting only the first pattern in the occurrence order of key character types as a key character candidate, and defining that the second and subsequent patterns in the occurrence order of key character types as non-key characters.

As a result, the sample pattern 62, which is a key character, can be correctly extracted as a key character, and the sample pattern 62, which is not a key character, can be prevented from being mistakenly extracted as a key character. As for the frequency of reference, about 3000 times of reference is required for the sample patterns 61 and 62 each by using the dictionary storing all JIS first level kanji character types, whereas 45 times of reference is required for the sample patterns 61 and 62 each by using the dictionary containing the character types shown in FIG. 24, thereby shortening the processing time.

FIG. 26 is a block diagram showing the configuration of the address recognition apparatus according to the sixth embodiment of the present invention.

In FIG. 26, 301 is an address recognition apparatus. An observation unit 303 reads an address image from listings 302 using a scanner, a CCD, etc. stores it as electronic data, and converts the data into monochrome binarized data. A character string segmentation unit 304 segments an address image in character string units. A labelling unit 305 performs a labelling process on each connected element of images in each line, and performs an overlapping label integrating process in the vertical direction for horizontally arranged characters. A contact portion determination/separation unit 306 determines a portion containing a contact between characters, and separates the characters.

A key character candidate extraction unit 308 extracts a key character candidate in a character string using a key character dictionary 307 and a key character level. When a key character candidate is extracted, the possibility of integration between a character and an adjacent label image is checked, a character recognizing process is performed on the character and a label image integrated with the character, thus obtaining recognition results up to the Nth order. Then, a character containing key character types in the first through the Nth character types in the recognition results is defined as a key character candidate, or a character having a key character level equal to or higher than a threshold is defined as a key character candidate. The character types entered in the key character dictionary 307 are limited to key characters and their similar character types. Therefore, key characters can be extracted at a high speed without lowering the precision in key character extraction.

A key character set candidate determination unit 310 determines a candidate for a key character set consistent with the address hierarchical structure knowledge entered in an address hierarchical structure knowledge unit 309 from the key character candidates extracted by the key character candidate extraction unit 308. A place-name word area segmentation unit 311 segments a place-name word area enclosed by key characters. A place-name word collective recognition unit 313 collectively recognizes place-name words by referring to a place-name word recognition dictionary 312, and determines one of the key character set candidates. A one-character recognition unit 315 recognizes a character by segmenting characters one by one from each part of an address representation. An address determination unit 317 checks whether or not a read result matches an actual address using the address knowledge entered in an address knowledge unit 316, and outputs the result matching the actual address.

Figure 27:
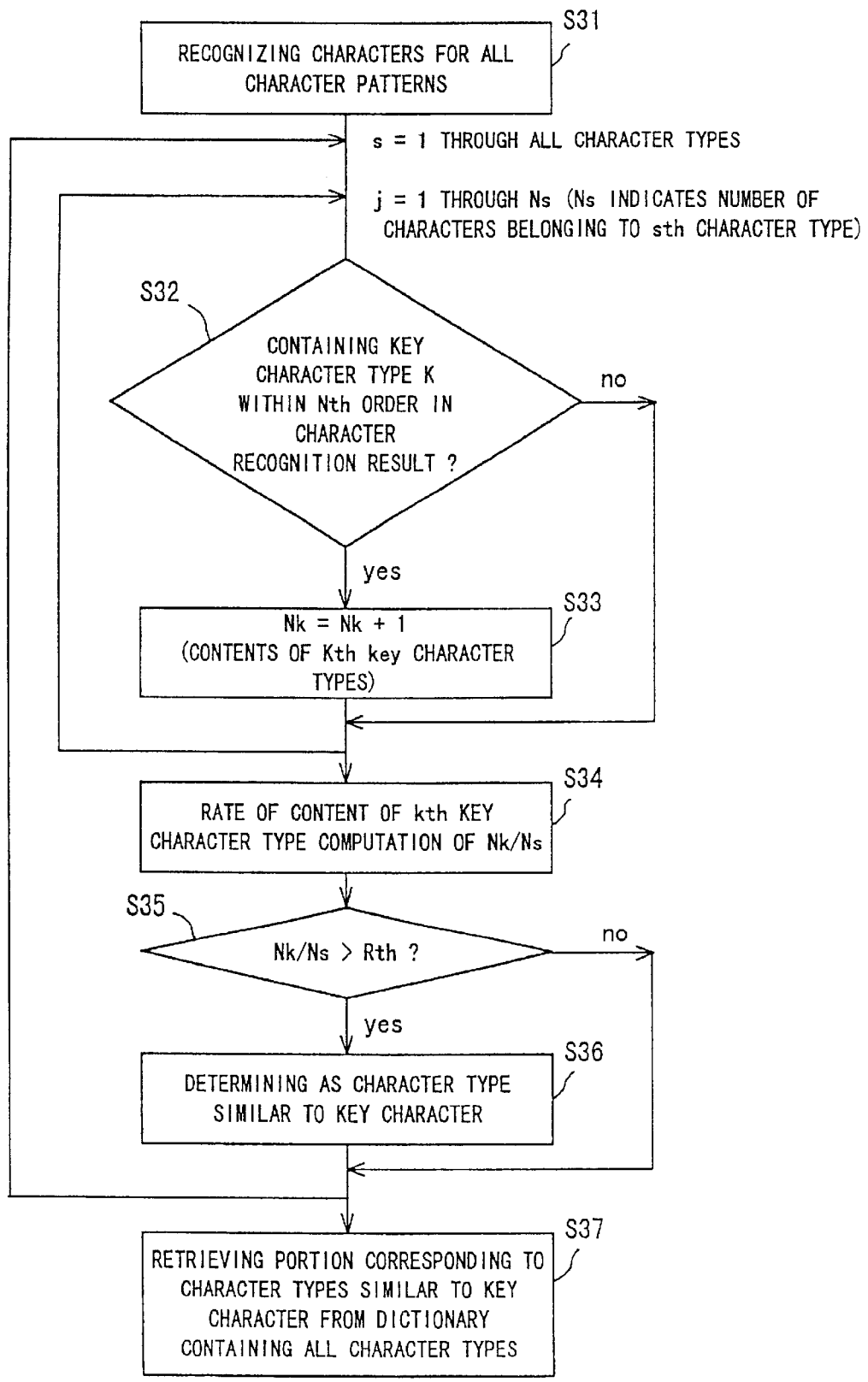
FIG. 27 is a flowchart showing the method of generating the key character recognition dictionary according to an embodiment of the present invention.

FIG. 27 is a flowchart showing the method of generating a key character recognition dictionary according to an embodiment of the present invention.

In FIG. 27, a character recognizing process is performed on each set of character types of sufficient sample patterns using a dictionary containing all character types (step S31), and character type candidates from the first to the Nth type. If any of the key character types is contained in the first through the Nth character type candidates (step S32), the number of contained key character types is incremented by 1 (step S33). Assuming that the number of sample patterns of the character types of a character on which a character recognizing process is performed is Ns, and the number of sample patterns containing the kth key character from the first to the Nth type is Nk, Nk/Ns is computed as the ratio of the content of the kth key character type (step S34) to check whether or not the following condition is satisfied (step S35).

$$Nk/Ns > Rth$$

Then, it is determined that the character type which satisfies the condition is a character type similar to the key character (step S36), and the portion corresponding to the character type similar to the key character is retrieved from the dictionary containing all character types (step S37). In the expression above, Rth indicates a proportional threshold, and can be set to an appropriate value through experiment.

For example, assume that the number of sample patterns of the character type '見' is 2000, the number of sample patterns containing the key character type '県' is 1500 from the first to the Nth type as a result of the character recognizing process performed on each sample pattern, and Rth= 0.5. Since Nk=1500, and Ns=2000, the following equation exists.

$$Nk/Ns = 0.75 > 0.5$$

As a result, it is determined that the character type '見' is a character type similar to the key character type '県'.

Figure 28:
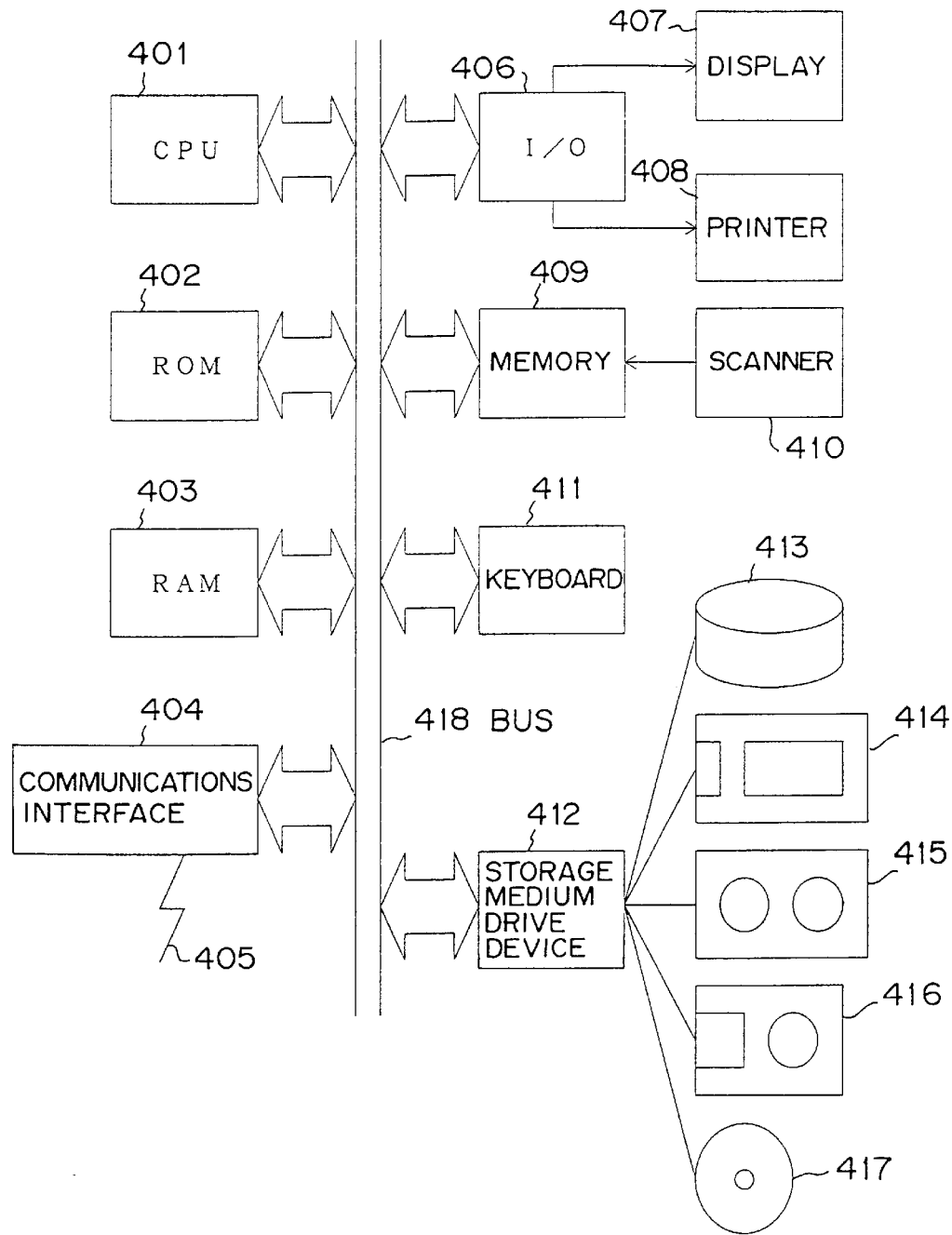
FIG. 28 is a block diagram showing the system configuration of the address recognition apparatus according to an embodiment of the present invention.

FIG. 28 is a block diagram showing the system configuration of the address recognition apparatus according to an embodiment of the present invention.

In FIG. 28, a central processing unit (CPU) 401 performs an entire process of the system. 402 is read-only memory (ROM). 403 is random-access memory (RAM). 404 is a communications interface. 405 is a communications network. 406 is an input/output interface. A display 407 displays a recognition result of an address, etc. A printer 408 prints a recognition result, etc. Memory 409 temporarily stores data read by a scanner 410. The scanner 410 reads an input image, etc. 411 is a keyboard. A driver 412 drives a storage medium. 413 is a hard disk. 414 is an IC memory card. 415 is a magnetic tape. 416 is a floppy disk. 417 is an optical disk such as CD-ROM, DVD-ROM, etc. 418 is a bus.

A program for performing an address recognizing process, the contents of the key character recognition dictionary, the contents of the place-name dictionary, the address hierarchical structure knowledge, the key character position in address knowledge, the place-name knowledge, etc. are stored in storage media such as the hard disk 413, the IC memory card 414, the magnetic tape 415, the floppy disk 416, the optical disk 417, etc. The address recognizing process can be performed by reading the program for performing an address recognizing process, the contents of the key character recognition dictionary, the contents of the place-name dictionary, the address hierarchical structure knowledge, the key character position in address knowledge, the place-name knowledge, etc. from the storage media to the RAM 403. Furthermore, the program for performing an address recognizing process, the contents of the key character recognition dictionary, the contents of the place-name dictionary, the address hierarchical structure knowledge, the key character position in address knowledge, the place-name knowledge, etc. can also be stored in the ROM 402.

The program for performing an address recognizing process, the contents of the key character recognition dictionary, the contents of the place-name dictionary, the address hierarchical structure knowledge, the key character position in address knowledge, the place-name knowledge, etc. can further be downloaded from the communications network 405 through the communications interface 404. As the communications network 405 connected to the communications interface 404, wireless communications networks such as a LAN (Local Area Network), a WAN (Wide Area Network), Internet, an analog telephone network, an ISDN (Integral Service Digital Network), a PHS (Personal Handyphone system), satellite communications, etc. can be used.

The CPU 401 extracts an address area from an input image read by the scanner 410 and extracts a key character from a pattern of an address area when the program for performing an address recognizing process is activated. Then, it checks whether or not the extracted key character is consistent with the address hierarchical structure knowledge and the key character position in address knowledge, and extracts a place-name area using a key character consistent with the address hierarchical structure knowledge and the key character position in address knowledge. When a place-name area is extracted, the patterns of place-name areas are collectively compared to extract a place-name. Then, it is checked whether or not the extracted place-name is consistent with the place-name knowledge. A place-name which is consistent with the place-name knowledge is output to the display 407 and the printer 408 as a result of reading an address.

An embodiment of the present invention has been described above, but the present invention is not limited to the above described embodiment, and can be variable within the range of the technological concept of the present invention. For example, a place-name delimiter character such as '県', '市', '町', '村', etc. can be extracted as key characters when the recognition of an address is explained. However, an organizational position delimiter character such as '部', '課', '係', etc. can be extracted as key characters when the recognition of an organizational post is adapted for use in a company.

As described above, according to the present invention, the place-name in a place-name area delimited at the point of a key character is recognized based on the state of a contact characters before separation. As a result, even if characters forming a character string indicating an address contact with each other, the entire character string indicating a place-name can be collectively extracted and processed in recognizing the place-name. Therefore, the process of segmenting a character string indicating a place-name into characters can be omitted, and the address can be efficiently recognized. Since it is not necessary to segment a character string indicating a place-name, mis-segmentation of the character string indicating the place-name can be avoided, thereby improving the correctness in address recognition.

According to an aspect of the present invention, the feature vector of the entire pattern segmented by a key character is compared with the feature vector of the place-name entered in the place-name entry dictionary so that the place-name can be recognized. Thus, the character string indicating the place-name can be collectively recognized without segmentation into single characters, thereby improving the efficiency and correctness in address recognition.

According to an aspect of the present invention, if the attribute of the pattern segmented by a key character is '県' (prefecture), a comparing operation is performed using a dictionary containing place-names of '県' (prefecture), thereby performing the comparing operation corresponding to the attribute specified by a key character with improved recognition precision.

According to a further aspect of the present invention, when a connected pattern extracted from an input pattern is separated, the separated position is evaluated based on the size of an input pattern. Thus, when a key character is extracted from an input pattern, the connected pattern can be separated for the size appropriate for extracting the key character. Therefore, the number of separation positions of the connected pattern can be reduced, and the number of times of the recognizing operations can also be reduced, thereby efficiently recognizing the address.

According to a further aspect of the present invention, a connected pattern for which a separation position can be detected based on the size of the connected pattern can be selected. Thus, the separation position is detected for only a relatively large connected pattern which probably contains contact characters. For a small connected pattern not regarded as containing contact characters, the detection of a separation position can be omitted, thereby improving the efficiency in address recognition.

According to a further aspect of the present invention, if the value of the minimum point of the histogram of the number of black picture elements in the input pattern is equal to or smaller than a predetermined value, it is defined as a separation point candidate. As a result, a contact point between characters can be detected, and a connected pattern can be separated at a contact point.

According to a further aspect of the present invention, the height-to-width ratio of a separated connected pattern can be within a predetermined value. Thus, the connected pattern can be prevented from being separated into portions of size inappropriate when a key character is extracted, and can be prevented from being separated into patterns not containing a key character, thereby efficiently recognizing an address with wasteful processes omitted for a pattern not containing a key character.

According to a further aspect of the present invention in which a provisional separation point candidate can be set in half character size, a part of a key character can be efficiently extracted from among contact characters even if only the left or right part of the key character contacts with another character when characters are horizontally written, and even if only the upper or lower part of the key character contacts with another character when characters are vertically written, thereby efficiently restoring the original key character.

According to an aspect of the present invention, even if there are a plurality of minimum points having the minimum value of the histogram of the number of black picture elements in the points within a predetermined range from the position of a multiple of a half size of an average character, only one provisional separation point candidate can be extracted by selecting the minimum point which has the smallest value of a histogram of the number of black picture elements. As a result, processes can be prevented from being complicated by separating a connected pattern into a number of portions at positions not delimiting characters.

According to an aspect of the present invention, even if there are a plurality of minimum points having the minimum value of the histogram of the number of black picture elements in the points within a predetermined range from the position of a multiple of a half size of an average character, only one provisional separation point candidate can be extracted by selecting the point which is the nearest to the position of a multiple of a half size of an average character. As a result, processes can be prevented from being complicated by separating a connected pattern into a number of portions at positions not delimiting characters.

According to a further aspect of the present invention, a key character can be extracted based on the result of integrating separated portions of a pattern. Thus, even if only a part of a character contacts with another character, the part of the character can be separated from the other character, and the separated part of the character can be integrated into the remaining part of the character to form the original character, thereby preventing a key character from being mis-recognized.

According to a further aspect of the present invention, a place-name area can be extracted from among the key character candidates extracted from the input pattern by prioritizing a key character candidate ranking a higher order. Thus, a character mis-extracted as a key character candidate can be prevented from being used in extracting a place-name area. As a result, the number of candidates to be extracted as place-name candidates can be reduced, and the number of times of the place-name recognizing processes can be reduced, thereby improving the efficiency in address recognition.

According to a further aspect of the present invention, the key character level of a key character candidate is entered to use by priority a key character candidate having a higher key character level. Simultaneously, when a combination of key characters which can be used in expressing an address cannot be obtained only by using the key character candidate used by priority, an additional key character candidate can be easily selected, thereby quickly performing a process.

According to a further aspect of the present invention, it is determined whether or not the arrangement order and positions of key characters, or the combination of key characters are appropriate for the indication of addresses. Therefore, even if a key character of an address is contained in a place-name, the key character contained in the place-name can be removed so that a character used to indicate the hierarchical level of the place-name can be specified as a key character, thereby preventing a place-name area from being mis-extracted, and efficiently recognizing an address.

According to a further aspect of the present invention, when there is a key character specified by a partial selection item, a set of key character candidates is determined from a hierarchical level lower than the hierarchical level of the key character. Thus, when a partial selection items are given to specify an address using, for example, a questionnaire postcard, the precision in key character extraction can be improved.

According to a further aspect of the present invention, when a set of key characters appropriate for an indication of an address cannot be obtained only by using a key character candidate ranking a higher order, a key character candidate ranking a lower order is added. Thus, a place-name area can be correctly extracted, and the number of key character candidates can be limited to the smallest possible number.

According to a further aspect of the present invention, what is lacking in a set of key characters used to indicate an address is added to key character candidates ranking lower orders. Thus, only necessary candidates are selected as key character candidates from among key character candidates ranking lower orders so that key characters can be efficiently extracted.

According to a further aspect of the present invention, the key character level of a key character candidate extracted from a character string indicating an address is computed, and a set of key character candidates is determined by prioritizing key character candidates having higher key character levels. Thus, when a set of key character candidates consistent in address hierarchical structure knowledge and in address key character position knowledge is determined, the processing time can be shortened by decreasing the number of sets of key character candidates, thereby efficiently recognizing an address.

According to a further aspect of the present invention, it is determined whether or not a combination of place-names indicating addresses or the arrangement order of place-names indicating an address are appropriate. Thus, if a plurality of place-name candidates are indicated to a pattern of a place-name area and a plurality of address candidates can be obtained by combining the place-name candidates, then combinations of place-names not expressing actual addresses are deleted so that only existing addresses can be identified, thereby improving the precision in address recognition.

According to a further aspect of the present invention, an address recognition result obtained by checking in character units a pattern extracted from a character string indicating an address is also output. As a result, even if a key character has not been successfully extracted, the address can be correctly recognized and the reliability in address recognition can be improved.

According to a further aspect of the present invention, the character type entered in the key character recognition dictionary is limited to the key character type and the character type similar to the key character type. Therefore, when a key character is extracted from the pattern segmented from an input image, the number of comparisons between the pattern segmented from the input image and the character type entered in the key character recognition dictionary can be reduced much more than the case where all character types are entered in the key character recognition dictionary, thereby shortening the processing time in recognizing an address. Furthermore, unlike the case where the key character recognition dictionary contains only key character types, the occurrence order of the key character type corresponding to the pattern to be recognized is taken into account, thereby successfully determining whether or not a pattern to be recognized is a key character. Thus, a pattern which is similar to, but is not, a key character can be correctly recognized with high precision. As a result, a non-key character pattern similar to a key character can be prevented from being mistakenly extracted as a key character and deteriorating the precision in recognizing an address.

According to a further aspect of the present invention, if the ratio of the number K of the sample patterns containing the key character type in the N-th order as a result of the character recognition to the number M of the sample patterns processed for character recognition of a character type is equal to or larger than a predetermined value, the character type is defined as a similar character type of the key character type. Thus, a character type similar to the key character type can be determined with high precision.

What is claimed is:

1. An address recognition apparatus, comprising:

key character extraction means for extracting a key character based on a separation result on contact characters, the key character belonging to one of a plurality of categories of place-name word area extraction means for extracting a place-name word area based on a position of the key character; and place-name word recognition means for recognizing a place-name word in the place name word area based on the category of the key character.

2. The apparatus according to claim 1, wherein said place-name word recognition means comprises:

a place-name word dictionary in which a typical feature vector of a place-name word pattern is entered;

comparison means for comparing the feature vector in the place-name word area with the feature vector of a place-name word entered in the place-name word dictionary; and output means for outputting a recognition result of the place-name word based on a comparison result.

3. The apparatus according to claim 2, wherein:

said place-name word dictionary contains a typical feature vector of the place-name word pattern for each attribute specified by the key character;

said comparison means compares the feature vector of the pattern delimited by the key character with the place-name word having the attribute specified by the key character.

4. An address recognition apparatus, comprising:

connected pattern extraction means for extracting a connected pattern from an input pattern;

separation position detection means for detecting separation positions for the connected pattern;

separation position evaluation means for evaluating the candidate separation positions based on a size of the input pattern;

connected pattern separation means for separating the connected pattern based on the evaluation result;

key character extraction means for extracting a key character based on a separation result of the connected pattern;

place-name word area extraction means for extracting a place-name word area based on the position of the key character; and place-name word recognition means for recognizing a place-name word in the place-name word area.

5. The apparatus according to claim 4, wherein said separation position detection means further comprises selection means for selecting a connected pattern for which a separation position is to be detected based on the size of the connected pattern.

6. The apparatus according to claim 4, wherein said separation position detection means comprises:
histogram generation means for computing a histogram of a number of black picture elements of the input pattern;
minimum point detection means for detecting a minimum point of the histogram of the number of black picture elements; and
separation point candidate detection means for defining as a separation point candidate a point having a value of the histogram of the number of black picture elements equal to or smaller than a predetermined value at the minimum point.

7. The apparatus according to claim 4, wherein said separation position evaluation means comprises:
area detection means for detecting an area in a range of a predetermined height-to-width ratio when the connected pattern is separated; and
exclusion means for removing a separation position beyond an area detected by said area detection means from among separation positions detected by said separation position detection means.

8. The apparatus according to claim 4, further comprising:

integration determination means for determining integration of a pattern before the integration based on a size of a pattern after the integration; and integration means for integrating the pattern before the integration based on a result of determining the integration, wherein:

said key character extraction means extracts the key character based on a pattern after integration by said integration means.

9. An address recognition apparatus comprising:

key character candidate extraction means for extracting key character candidates from an input pattern;

ranking means for ranking the key character candidates based on a recognition result of the key character candidates;

place-name word area extraction means for extracting a place-name word area based on a position of a highly ranked key character candidate; and place-name word recognition means for recognizing a place-name word in the place-name word area.

10. The address recognition apparatus according to claim 9, wherein said place-name word area extraction means comprises:
determination means for determining whether or not an arrangement order and an arrangement position of a key character, or a combination of key character candidates is available in expressing an address; and
addition means for adding a key character candidate ranked lower when it is impossible to express an address only by using a key character candidate ranked high.

11. The apparatus according to claim 10, wherein said addition means only adds key character candidates missing in a set of key characters used in expressing an address among key character candidates ranked low.

12. An address recognition apparatus, comprising:

a labelling unit for labelling each of connected elements of an input pattern;

a single character area determination unit for determining a single character area based on an integration result of a connected pattern in which rectangles enclosing the connected elements have overlap levels equal to or larger than a predetermined value;

an average character size computation unit for computing an average character size based on a size of the single character area;

a contact portion determination unit for determining a contact portion between characters in the connected pattern based on the average character size;

a separation unit for separating the connected pattern based on a determination result of the contact portion between the characters;

a rectangle area generation unit for generating a rectangular area as comparison units based on a separation result of the connected pattern;

a key character recognition dictionary unit for entering characters used in expressing an address;

a key character candidate extraction unit for extracting key character candidate by comparing a pattern enclosed by the rectangular area with a character entered in said key character recognition dictionary unit;

an address hierarchical structure knowledge unit for storing address hierarchical structure knowledge relating to a possible combination and an arrangement order in an address expression of key characters.

a key character position in address knowledge unit for storing a key character position in address knowledge relating to an applicable arrangement position of key characters in an address;

a key character candidate determination unit for determining a possible combination of key character candidates used in expressing an address in the key character candidates by referring to the address hierarchical structure knowledge and the key character position in address knowledge;

a place-name word segmentation unit for segmenting a place-name word from areas delimited by a key character candidate determined by said key character candidate determination unit;

an place-name word feature extraction unit for extracting a feature vector of the place-name word;

a place-name word dictionary unit for storing a feature vector of the place-name word;

place-name word collective recognition unit for recognizing the place-name word by comparing the feature vector of the place-name word extracted by said place-name word feature extraction unit with the feature vector of the place-name word entered in said place-name word dictionary unit;

a place-name knowledge unit for storing place-name knowledge as to whether or not a combination of place-names used in expressing an address can be accepted, or an arrangement order of place-names used in expressing an address is appropriate; and an address determination unit for determining an address by checking whether or not a recognition result of the place-name word is consistence with the place-name knowledge.

13. The apparatus according to claim 12, wherein said key character candidate determination unit determines a combination of key character candidates extracted by said key character candidate extraction unit as a set of key character candidates when the combination is consistent with the address hierarchical structure knowledge, and arrangement positions and orders of the key character candidates are consistent with the key character position in address knowledge.

14. The apparatus according to claim 13, wherein said key character candidate determination unit determines a set of key character candidates from a hierarchical level lower than that of key characters when the key characters are specified by a partial selection item.

15. The apparatus according to claim 12, wherein said contact portion determination unit comprises:
    a height-to-width ratio computation unit for computing a height-to-width ratio of an enclosing rectangle of a pattern in the single character area;
    a contact character determination unit for determining whether or not contact characters are contained in the connected pattern based on the height-to-width ratio of the enclosing rectangle;
    a number of black picture element histogram generation unit for generating a histogram of a number of black picture elements counted in a direction vertical to a character string for a connected pattern determined as containing contact characters;
    a smoothing unit for smoothing the histogram of the number of black picture elements by performing a moving average operation on the histogram of the number of black picture elements; and
    a provisional separation point candidate computation unit for computing a provisional separation point candidate for the connected pattern based on the smoothed histogram of the number of black picture elements.

16. The apparatus according to claim 15, wherein said provisional separation point candidate is one of minimum points of the histogram of the number of black picture elements having a value equal to or smaller than a predetermined threshold.

17. The apparatus according to claim 15, wherein said provisional separation point candidate is within a predetermined range of a point a multiple of ½ of an average character width horizontally distant from a character when characters are horizontally written, and within a predetermined range of a point a multiple of ½ of the average character height vertically distant from a character when characters are vertically written.

18. The apparatus according to claim 17, wherein said provisional separation point candidate is a minimum point, in points within the predetermined range, having a smallest value of the histogram of the number of black picture elements.

19. The apparatus according to claim 18, wherein said provisional separation point candidate is closest to a point a multiple of ½ of a character size in minimum points having a smallest value of the histogram of the number of black picture elements.

20. The apparatus according to claim 12, wherein said key character candidate extraction unit comprises:
    an integration determination unit for determining whether or not connected patterns are to be integrated based on a width, height, or height-to-width ratio of an integrated pattern obtained by integrating adjacent patterns;
    a provisional integration unit for provisionally integrating the connected patterns based on the integration determination result.

21. The address recognition apparatus according to claim 20, further comprising:
    an integrated pattern recognition unit for recognizing key characters for a provisionally integrated pattern; and
    a single pattern recognition unit for recognizing key characters for a single pattern before provisional integration.

22. The apparatus according to claim 21, wherein said integrated pattern recognition unit comprises a first key character level computation unit for computing a key character level based on a distance between a feature vector of the provisional integrated pattern and a feature vector of a key character type entered in said key character recognition dictionary, and an occurrence order of the key character type.

23. The apparatus according to claim 21, wherein said single pattern recognition unit comprises a second key character level computation unit for computing a key character level based on a distance between a feature vector of the single pattern and a feature vector of a key character type entered in said key character recognition dictionary, and an occurrence order of the key character type.

24. The apparatus according to claim 22, wherein said key character candidate extraction unit comprises a pattern information table generation unit for generating a pattern information table of a key character level of a key character candidate, a key character type, a hierarchical level, position coordinates, information as to whether or not a pattern is to be incorporated into an adjacent pattern.

25. The apparatus according to claim 22, wherein said key character candidate extraction unit comprises:
    a key character candidate detection unit for detecting a pattern having a key character level equal to or higher than a threshold as a key character candidate; and
    a semi-key character candidate detection unit for detecting a pattern having the key character level lower than the threshold and not 0 as a semi-key character candidate.

26. The apparatus according to claim 25, further comprising:
    an insufficient key character re-extraction unit for extracting from the semi-key character candidates a key character which has a required address hierarchical level or a required character type when there are no sets of key character candidates consistent with the address hierarchical structure knowledge and the key character position in address knowledge.

27. The apparatus according to claim 12, wherein
a provisional separation point, from which the key character candidates is generated, is defined as a separation point when a set of key character candidates consistent with the address hierarchical structure knowledge and the key character position in address knowledge is determined.

28. The apparatus according to claim 19, wherein
a provisional integrated pattern, from which the key character candidates is generated, is defined as an integrated pattern when a set of key character candidates consistent with the address hierarchical structure knowledge and the key character position in address knowledge is determined.

29. The apparatus according to claim 12, wherein
said place-name word segmentation unit segments all patterns from a first address character to a character immediately before a first key character, and all patterns after a second key character as place-name words.

30. The apparatus according to claim 12, wherein
said address determination unit outputs a combination of place-names entered in a place-name knowledge unit as a result of reading an address in a plurality of combinations of place-name candidates obtained by a place-name word collective recognition unit.

31. The apparatus according to claim 12, wherein
an error code is output when a set of key character candidates consistent with the address hierarchical structure knowledge and the key character position in address knowledge is not determined, or when no addresses consistent with the place-name knowledge are obtained.

32. The apparatus according to claim 12, further comprising:
a single character recognition dictionary for storing a feature vector for each character; and
a single character recognition unit for recognizing a single character by comparing a feature vector of a pattern in the single-character area with a feature vector entered in the single character recognition dictionary.

33. An address recognition apparatus, comprising:
key character extraction means for extracting a key character from an input image; and
collective recognition means for collectively recognizing a pattern delimited by the key character.

34. The apparatus according to claim 33, further comprising
a key character recognition dictionary in which entered character types are limited only to key character types and character types similar to the key character types.

35. The apparatus according to claim 34, wherein
when a ratio of a number K of sample patterns containing key character types in a first through Nth types obtained as a result of a character recognizing process to a number M of sample patterns of a character type on which the character recognizing process has been performed is equal to or higher than a predetermined value, the character type is defined as a character type similar to the key character type.

36. The apparatus according to claim 34, wherein
said key character extraction means comprises:
comparison means for comparing a pattern segmented from the input image with the character type entered in said key character recognition dictionary; and
key character candidate determination means for determining as a key character candidate a key character type which is obtained by said comparison means as having a higher occurrence order in patterns segmented from the input image.

37. The apparatus according to claim 36, wherein
said comparison means defines an occurrence order of the key character type based on a difference level or similarity between the pattern segmented from the input image and the character type entered in said key character recognition dictionary.

38. The apparatus according to claim 37, wherein
when there are two patterns having an equal difference level or similarity to a key character type and an equal occurrence order of the key character type, said key character candidate determination means detects a difference in difference level or similarity from a first order character for each of the two patterns, and prioritizing an order, as a key character, of a pattern having a smaller difference from the first order candidate in difference level or similarity.

39. A key character recognition dictionary in which entered character types are limited only to key character types and character types similar to the key character types.

40. An address recognizing method, comprising the steps of:
extracting a place-name word area based on a position of a key character;
collectively recognizing a place-name word by comparing an entire pattern contained in the place-name word area; and
recognizing an address based on a recognition result of the place-name word.

41. An address recognizing method, comprising the steps of:
segmenting a rectangle area from a connected pattern based on the size of a key character;
extracting a key character based on a pattern contained in the rectangle area; and
recognizing an address based on the extraction result of the key character.

42. An address recognizing method, comprising the steps of:
extracting a key character area from an input pattern;
selecting the key character area based on the recognition result of the pattern contained in the key character area;
extracting a place-name word area based on a position of the selected key character area; and
recognizing an address based on the extraction result of the place-name word area.

43. An address recognizing method for recognizing an address by extracting a key character, comprising the step of recognizing a place-name word delimited by the key character by collectively processing a character string indicating the place-name word without separating the character string in character units.

44. A method of recognizing an address by extracting a key character from an input image, comprising the step of
extracting the key character by comparing a pattern segmented from the input image with character types limited to key character types and character types similar to the key character types.

45. A computer-readable storage medium used to direct a computer to perform the functions of:
extracting a place-name word area based on a position of a key character;
recognizing a place-name word by collectively comparing an entire pattern contained in the place-name word area; and recognizing an address based on a recognition result of the place-name word.

46. A. computer-readable storage medium used to direct a computer to perform the functions of:

segmenting a rectangle area from a connected pattern based on the size of a key character;

extracting the key character based on a pattern contained in the rectangle area; and recognizing an address based on the extraction result of the key character.

47. A computer-readable storage medium used to direct a computer to perform the functions of:

extracting a key character area from an input pattern;

selecting the key character area based on the recognition result of a pattern contained in the key character area;

extracting a place-name word area based on a position of the selected key character area; and recognizing an address based on the extraction result of the place-name word area.

48. A computer-readable storage medium storing a program for directing a computer to perform the functions of:

comparing a pattern segmented from an input image with character types limited to key character types and character types similar to the key characters; and collectively recognizing a pattern delimited by a key character.

49. An address recognition apparatus, comprising:

a key character extraction unit to extract key character candidates;

a key character recognition unit to recognize key character candidates;

a ranking unit to rank the key character candidates; and a selection unit to select highly ranked key character candidates and exclude key character candidates appearing in a place name field; and a place name recognition unit to recognize place names based on their position with respect to the selected key character candidates.

50. An address recognition apparatus according to claim 49, wherein key character candidates are excluded by evaluating different groupings of key character candidates and selecting a grouping that fits within a hierarchical address structure.

51. An address recognition apparatus according to claim 49, wherein the place name is recognized using a place name dictionary containing place names and feature vectors associated with the place names, such that for each place name, a feature vector is extracted from the place name and the extracted feature vector is matched with a feature vector stored in the dictionary.

52. An address recognition apparatus according to claim 49, further comprising:

a separation position detection unit to detect candidate separation positions for a connected pattern; and a separation position evaluation unit to evaluate candidate separation positions.

53. An address recognition apparatus according to claim 52, wherein the separation position evaluation unit excludes candidate separation positions that would result in a word field smaller than a predetermined size.

54. An address recognition apparatus according to claim 52, wherein the separation position evaluation unit excludes candidate separation positions that would result in a word field having a height-to-width ratio outside of a predetermined range of expected ratios.

* * * * *